United States Patent [19]

Sakamoto et al.

[11] Patent Number: 5,488,552

[45] Date of Patent: Jan. 30, 1996

[54] INVERTER POWER SUPPLY

[75] Inventors: Hiroshi Sakamoto, 6-388-3, Tsuboi, Kumamoto-shi, Kumamoto; Hideki Tamura, Moriyama; Kaoru Furukawa, Hikone, all of Japan

[73] Assignees: Hiroshi Sakamoto, Kumamoto; Matsushita Electric Works, Osaka, both of Japan

[21] Appl. No.: 132,454

[22] Filed: Oct. 6, 1993

[30] Foreign Application Priority Data

Oct. 7, 1992 [JP] Japan ................................. 4-268909
Jun. 25, 1993 [JP] Japan ................................. 5-154864

[51] Int. Cl.$^6$ ................................................. H02M 3/335
[52] U.S. Cl. ............................. 363/21; 363/41; 363/49; 363/97; 363/132; 363/16
[58] Field of Search ............................. 363/18, 19, 20, 363/21, 41, 49, 95, 97, 98, 131, 132, 135, 136, 16; 323/901

[56] References Cited

U.S. PATENT DOCUMENTS

| | | | |
|---|---|---|---|
| 3,938,018 | 2/1976 | Dahl | 320/2 |
| 4,005,351 | 1/1977 | Blum | 321/14 |
| 4,422,032 | 12/1983 | Kakumoto et al. | 320/39 |
| 4,445,049 | 4/1984 | Steigerwald | 307/45 |
| 4,496,896 | 1/1985 | Melocik et al. | 320/2 |
| 4,504,896 | 3/1985 | Easter et al. | 363/21 |
| 4,757,433 | 7/1988 | Santelmann, Jr. | 363/19 |
| 4,901,214 | 2/1990 | Hiramatsu et al. | 363/19 |
| 4,956,761 | 9/1990 | Higashi | 363/19 |
| 4,958,268 | 9/1990 | Nagagata et al. | 363/16 |
| 4,961,048 | 10/1990 | Banura | 323/351 |
| 5,103,386 | 4/1992 | Herrmann | 363/21 |
| 5,225,972 | 7/1993 | Sakamoto | 363/18 |
| 5,333,104 | 7/1994 | Tamura et al. | 363/19 |

FOREIGN PATENT DOCUMENTS

| | | |
|---|---|---|
| 4208911 | 9/1992 | Germany. |
| 3-195362 | 8/1991 | Japan. |
| 3-207266 | 9/1991 | Japan. |

*Primary Examiner*—Peter S. Wong
*Assistant Examiner*—Adolf Berhane
*Attorney, Agent, or Firm*—Armstrong, Westerman, Hattori, McLeland & Naughton

[57] ABSTRACT

An inverter power supply operating at a high efficiency to provide an AC voltage to a load. The power source includes a DC voltage source and an output transformer with a primary winding, secondary winding, and a feedback winding. An FET is connected in series with the primary winding across the DC voltage source. The primary winding is connected to a capacitor to form a L-C resonant circuit which, in response to the switching of FET, provides across the primary winding an oscillation voltage to be applied through the secondary winding to drive a load, while inducing a feedback voltage across the feedback winding. The oscillation voltage is allowed to go negative at a point between FET and the primary winding. A biasing capacitor is connected to apply an offset voltage which is additive to the feedback voltage so as to give a bias voltage to FET. The power supply is characterized to include a level detector which issues a zero voltage signal when the oscillation voltage is detected to lower to at least zero level, and to include a pulse generator which, in response to the zero voltage signal, produces a pulse of a predetermined pulse-width which overrides the feedback voltage in such a manner as to enable FET to turn on for a ON-period determined by the pulse-width only after the oscillation voltage is lowered to at least zero level, whereby avoiding FET from flowing a current while the oscillation voltage is still positive and therefore reducing a switching loss.

15 Claims, 17 Drawing Sheets

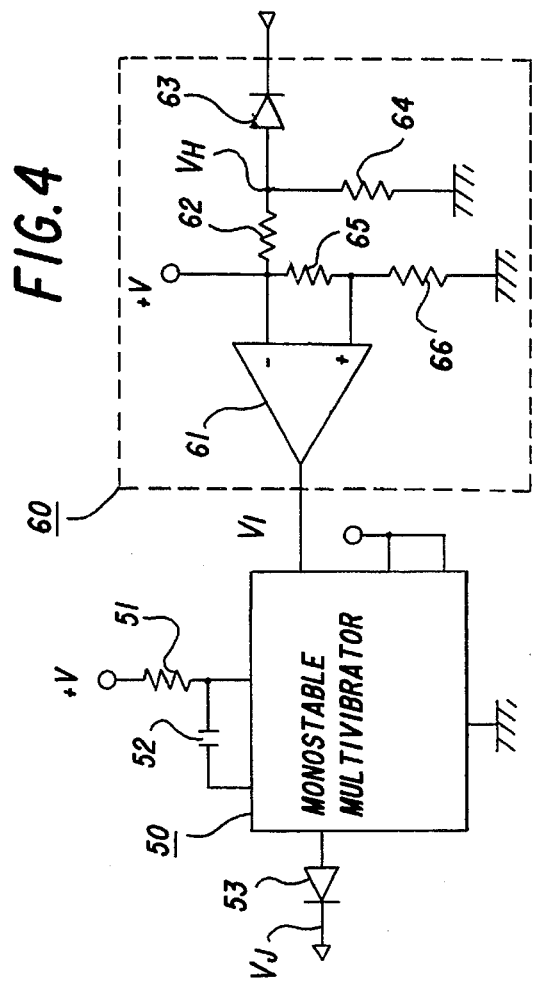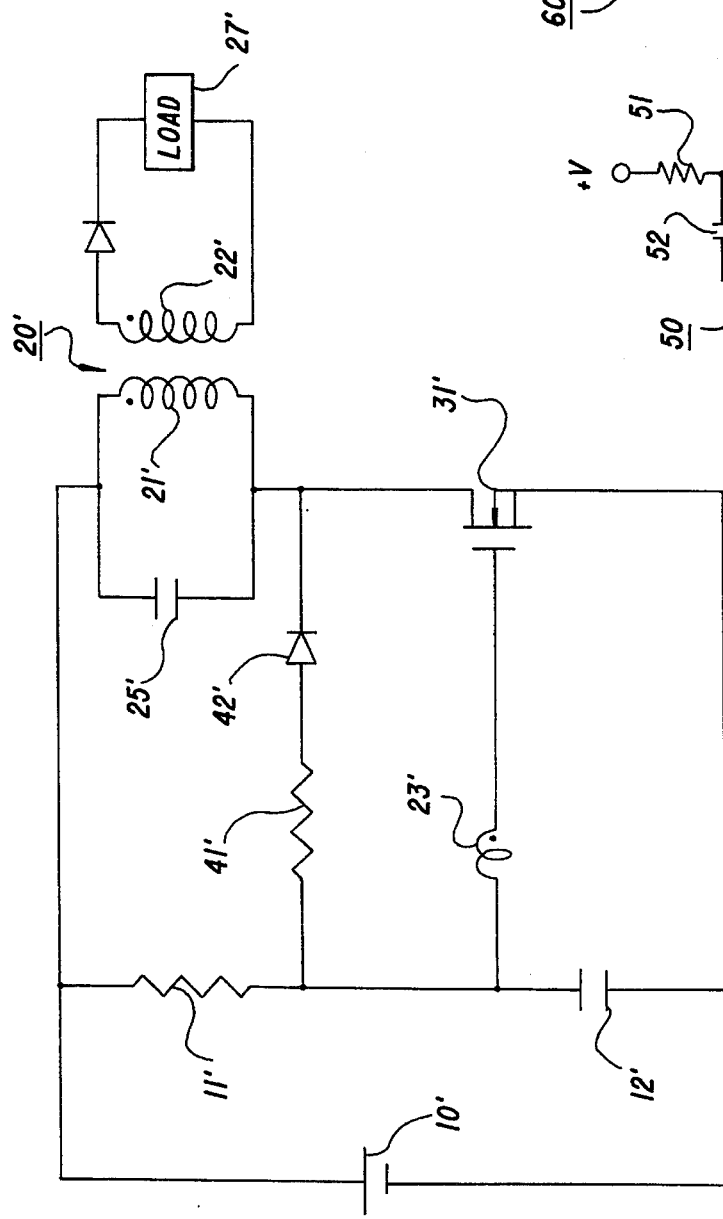

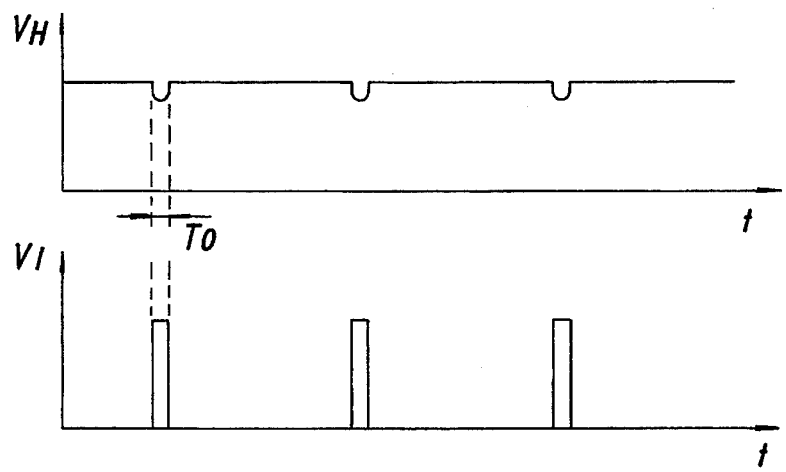
FIG.5A
FIG.5B
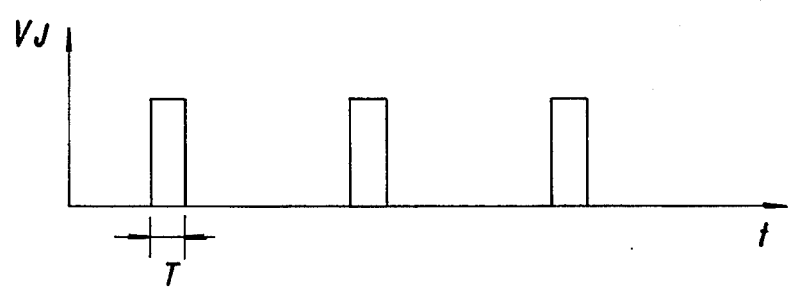
FIG.5C
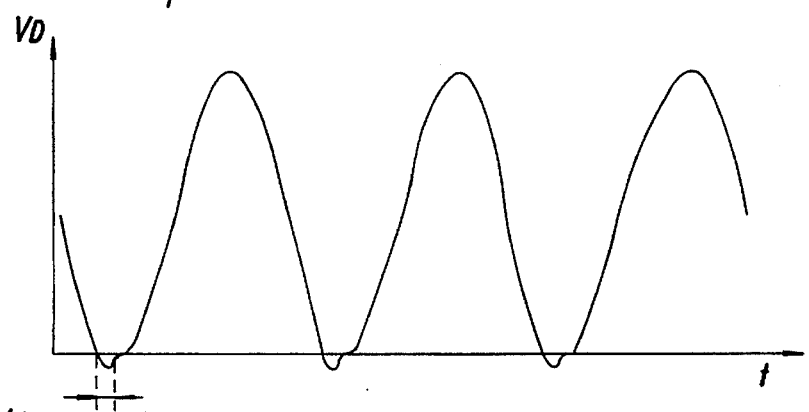
FIG.6A
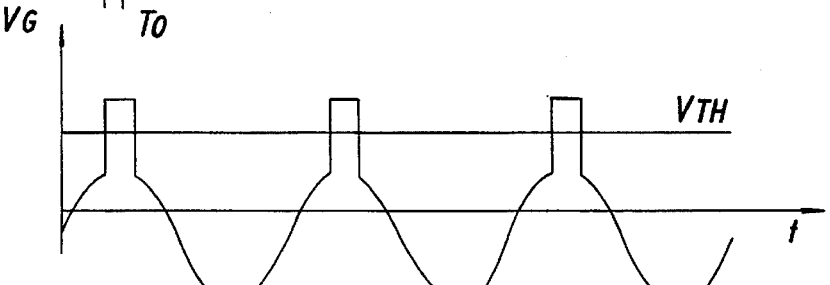
FIG.6B
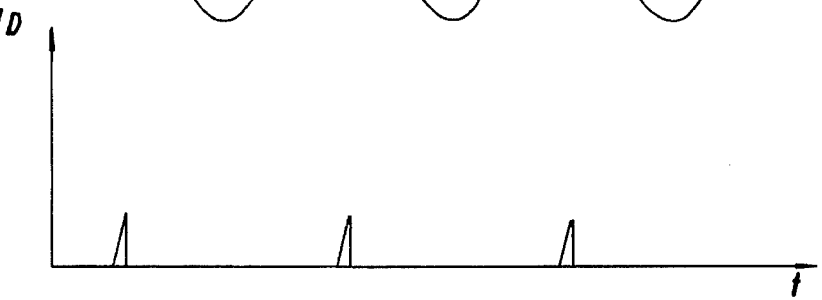
FIG.6C

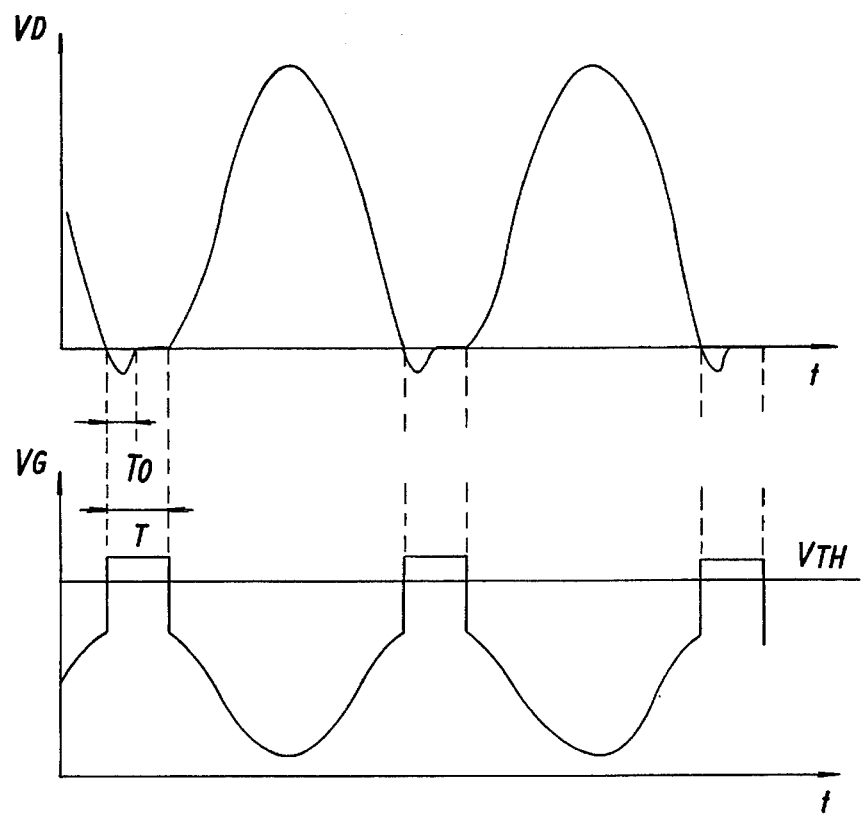
FIG.14A
FIG.14B
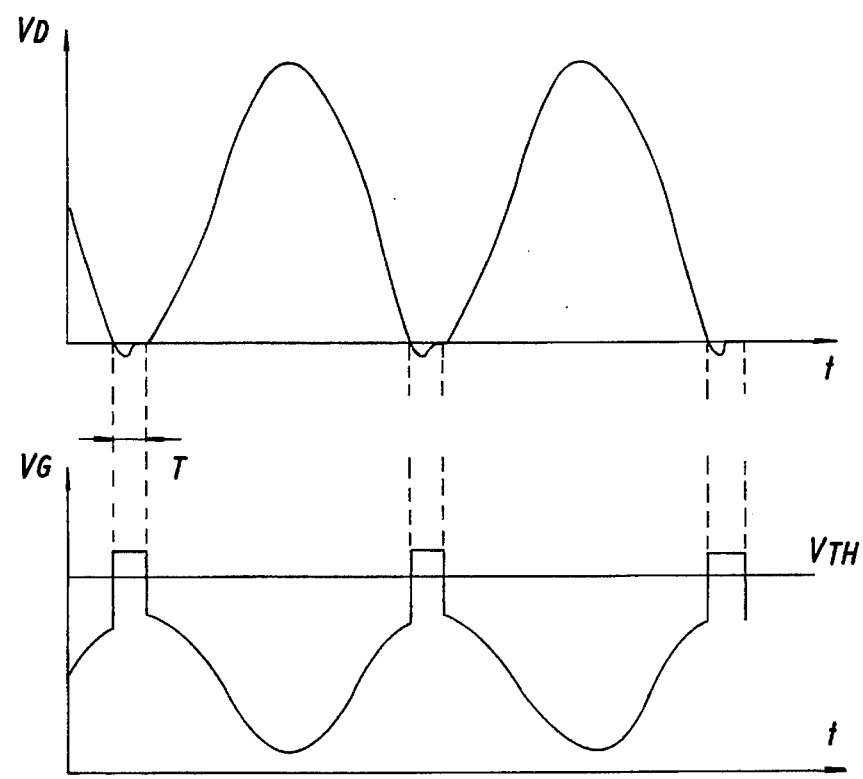
FIG.15A
FIG.15B

INVERTER POWER SUPPLY

BACKGROUND OF THE INVENTION

1. Field of the Invention

The present invention is directed to an inverter power supply providing from a DC voltage source an oscillation voltage for driving a load and operating with a minimum switching loss.

2. Description of the Prior Art

A prior art inverter power supply is proposed in U.S. Pat. No. 5,225,972. As represented in FIG. 1, the prior power supply comprises a DC voltage source 10', an FET 31', and a transformer 20' having a primary winding 21', a secondary winding 22', and a feedback winding 23'. The primary winding 21' forms a parallel L-C resonant circuit with a capacitor 25'. FET 31' is connected in series with the L-C resonant circuit across the DC voltage source 10' and is driven to turn on and off for causing the L-C resonant circuit to produce an oscillation voltage across the primary winding 21', which in turn produces a corresponding output voltage for driving a load 27' and at the same time to induce a feedback voltage at the feedback winding 23'. The power supply includes a starter circuit composed of a resistor 11' and a biasing capacitor 12' connected in series across the DC voltage source 10'. The biasing capacitor 12' is connected in series with the feedback winding 23' across a source-gate path of FET 31' for providing an offset voltage which is additive to the feedback voltage at the feedback winding 23' to give a bias voltage $V_G$ applied to a gate of FET 31' for self-excited oscillation. Further, the power supply includes a bias stabilizing circuit which determines a suitable bias fed to FET 31' at the start of energization of the power supply for assuring to effect subsequent oscillation in a stable manner. The bias stabilizing circuit comprises a resistor 41' and a bypass diode 42' which are connected in series with FET 31' across the biasing capacitor 12' so that, during the ON-period of FET 31', the biasing capacitor 12' is discharged through the bias stabilizing circuit of resistor 41' and diode 42', and through FET 31' to lower the offset voltage of biasing capacitor 12'. At the start of the power supply, the DC voltage source 10' is connected to begin charging biasing capacitor 12' through resistor 11'. When the biasing capacitor 12' is charged to exceed a threshold voltage $V_{TH}$ of FET 31', FET 31' becomes conductive to flow a current through the primary winding 21' with an attendant decrease in a drain voltage $V_D$ of FET 31'. Subsequently, when drain voltage $V_D$ becomes lower than the voltage of capacitor 12', the bias stabilizing circuit is in operation to discharge the capacitor 12' through resistor 41' and diode 42' and through FET 31', thereby lowering the bias voltage below the threshold voltage $V_{TH}$ to turn off FET 31'. Then, the L-C resonant circuit responds to start providing the oscillation voltage while inducing the corresponding feedback voltage. When the feedback voltage added to the voltage of capacitor 12' increases to such a level that the resulting bias voltage $V_G$ exceeds the threshold voltage $V_{TH}$, FET 31' becomes again conductive to flow the current through the L-C circuit and through FET 31', after which the bias stabilizing circuit acts to lower the bias voltage until FET 31' is turned off. In this manner, the ON-period of FET 31' is gradually reduced with corresponding lowering of the voltage of capacitor 12' until a stable oscillation is reached in which FET 31 is made conductive only for a limited ON-period. That is, the bias voltage is self-adjusted by varying the offset voltage of capacitor 12' in order to assure the stable oscillation with increased efficiency.

However, the prior power supply is found to be still unsatisfactory in minimizing a switching loss due to a certain phenomenon seen in the prior power supply. With the self-excited oscillation utilizing the sinusoidal feedback voltage, it occurs, as shown in FIG. 2, that the bias voltage $V_G$ will increase to exceed the threshold voltage $V_{TH}$ shortly before the oscillation voltage, i.e., the drain voltage $V_D$ of FET 31' reduces to zero. Consequently, a current $I_D$ is caused to flow through FET 31' within a time interval $T_1$ prior to the oscillation voltage reduces to zero, resulting in a switching loss and therefore lowering the efficiency of the circuit. In addition, it also occurs that, within a time interval $T_2$ where the bias voltage exceeds the threshold voltage $V_{TH}$, the current ID is caused to flow through FET 31' while the oscillation voltage increases above zero, which is also responsible for the switching loss. In other words, the prior power supply fails to effect the switching of FET in coincident as close as possible with the zero voltage of the oscillation voltage and suffers from a certain switching loss and reduced efficiency.

SUMMARY OF THE INVENTION

The above problem has been eliminated in the present invention which provides an improved inverter power supply with a minimum switching loss. The power supply in accordance with the present invention comprises a DC voltage source and an output transformer with a primary winding, secondary winding, and a feedback winding. A switching transistor with a control terminal is connected in series with the primary winding across the DC voltage source. The primary winding is connected to a capacitor to form a L-C resonant circuit which, in response to the switching of the transistor, provides across the primary winding an oscillation voltage to be applied through the secondary winding to drive a load, while inducing a feedback voltage across the feedback winding. The oscillation voltage is allowed to go negative at a point between the transistor and the primary winding. A biasing capacitor is connected to apply an offset voltage which is additive to the feedback voltage so as to give a bias voltage to the control terminal of the transistor for controlling the transistor to turn on and off. The power supply is characterized to include a level detector which issues a zero voltage signal when the oscillation voltage is detected to lower to at least zero level, and to include a pulse generator which, in response to the zero voltage signal, produces a pulse of a predetermined pulse-width which overrides the feedback voltage in such a manner as to enable the switching transistor to turn on for a ON-period determined by the pulse-width only after the oscillation voltage is lowered to at least zero level, whereby avoiding the switching transistor from being made conductive while the oscillation voltage is still positive and therefore reducing a switching loss to minimum. Also, since the pulse-width which determines the ON-period of the switching transistor can be suitable selected in consideration of the resonant characteristic to terminate at a timing before the oscillation voltage increases to a great extent from the zero level, it is even possible to reduce the switching loss at the end of the ON-period.

Accordingly, it is a primary object of the present invention to provide an improved power supply which is capable of operating with a minimum switching loss and therefore at a maximum efficiency.

In a preferred embodiment, the pulse voltage from the pulse generator is superimposed on the feedback voltage such that the switching transistor is conductive only for an ON-period determined by the pulse width.

The level detector is configured to issue the zero voltage signal when the oscillation voltage is detected to lower to a zero level or when the oscillation voltage is detected to reach a negative peak.

The power supply is preferred to include an input voltage monitor which issues a limit signal when an input DC voltage from the DC voltage source becomes greater than a predetermined voltage level. The limit signal is fed to the pulse generator with a pulse-width controller which reduces the pulse-width and therefore the ON-period of the switching transistor in response to the limit signal, thereby limiting the oscillation voltage to a desired level and therefore providing a constant output voltage irrespective of the increase in the input DC voltage. The power supply may also include an output voltage monitor which issues a limit signal when an output DC voltage from said secondary winding becomes greater than a predetermined voltage level. The limit signal is fed to the pulse generator with a pulse-width controller which reduces the pulse-width and therefore the ON-period of the switching transistor in response to the limit signal, thereby limiting the oscillation voltage to a desired level and therefore providing a constant output voltage irrespective of possible variations in the load condition. These above limiting operation is enabled during the operation of the power supply to thereby effect an on-time control of providing a constant output voltage irrespective of variations in the input and output voltage, which is therefore a further object of the present invention.

In another preferred embodiment, an element such as a diode or resistor is inserted between the switching transistor and ground so as to develop a corresponding potential across the element when the switching transistor is conductive to flow a current through the element. The resulting potential acts to raise a threshold voltage of the switching transistor with respect to the ground. A bypass switch is connected in parallel with the element to cancel the raising of the threshold voltage with respect to the ground when it is closed to shunt the element. The bypass switch is actuated by the pulse generator to be closed when the pulse generator produces the pulse of a predetermined pulse-width in response to that the oscillation voltage is detected to lower to at least zero level. With this arrangement, when the feedback voltage increases to turn on the switching transistor while the oscillation voltage is still positive, the element acts to immediately raise the threshold voltage of the switching transistor with respect to the ground so as to turn off the switching transistor for avoiding the transistor from flowing an undesired current so far as the oscillation voltage is still positive. And the threshold voltage is restored or lowered to normal when the bypass switch is closed in response to that the oscillation voltage is detected to lower to zero level, thereby enabling the switching transistor to flow the current substantially only after the oscillation voltage lowers to zero level. Consequently, it is equally possible with this circuit configuration to reduce a switching loss to a minimum, which is therefore another object of the present invention.

Preferably, a resistor is connected in series with the element across the DC voltage source in order to constantly develop the potential across the element, thereby enabling to raise the threshold voltage to a higher constant level than the bias voltage unless the bypass switch is closed by the pulse generator. Therefore, the threshold voltage can be lowered and surpassed by the bias voltage only when the oscillation voltage is detected to turn from positive to zero or negative such that the switching element is made conductive only after the oscillation voltage lowers to zero or to the negative peak.

Consequently, it is a still further object of the present invention to provide an improved power supply in which the switching transistor can be well prohibited from turning on while the oscillation voltage is still positive, thereby minimizing the switching loss.

In a further preferred embodiment, the element inserted between the switching transistor and the ground is provided in the form of a series connected pair of first and second resistors. A bipolar transistor is connected in parallel with the series combination of said switching transistor and first and second resistors and also in parallel with the series combination of the biasing capacitor and the feedback winding. The second resistor is connected across a base-emitter path of the bipolar transistor such that, when the switching transistor flows a current exceeding a predetermined level to give a corresponding voltage across the second resistor, the bipolar transistor responds to turn on to thereby turn off the switching transistor. With this arrangement, it is readily possible to limit the current flowing through the switching transistor at the start of the power supply by reducing the ON-period of the switching transistor, thereby restraining the energy supplied to the L-C resonant circuit to a desired level and therefore preventing an unduly high fly-back voltage which would otherwise develop at the subsequent turn off of the switching transistor.

It is therefore a still further object of the present invention to provide an improved power supply which is capable of eliminating an unduly high flyback voltage at the start of the circuit.

These and still further objects and advantageous features of the present invention will become apparent from the following description of the preferred embodiments when taken in conjunction with the attached drawings.

BRIEF DESCRIPTION OF THE DRAWINGS

FIG. 1 is a circuit diagram of a prior power supply;

FIG. 4 is a circuit diagram of a pulse generator and a zero-voltage detector utilized in the circuit of FIG. 3;

FIG. 5 is a waveform chart illustrating the operation of the pulse generator;

FIG. 6 is a waveform chart illustrating the operation of the power supply of FIG. 3;

FIGS. 14 and 15 are waveform charts illustrating the operation of the power supply of FIG. 12;

DETAILED DESCRIPTION OF THE EMBODIMENTS

Figure 2A:
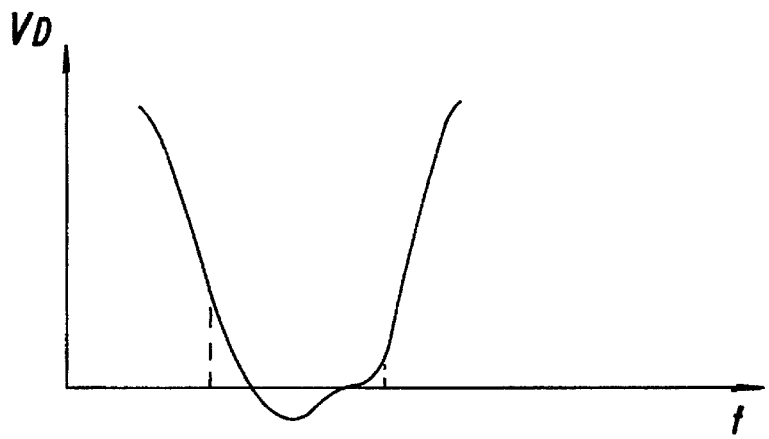
FIG. 2 is a waveform chart illustrating the operation of FIG. 1.
Figure 2B:
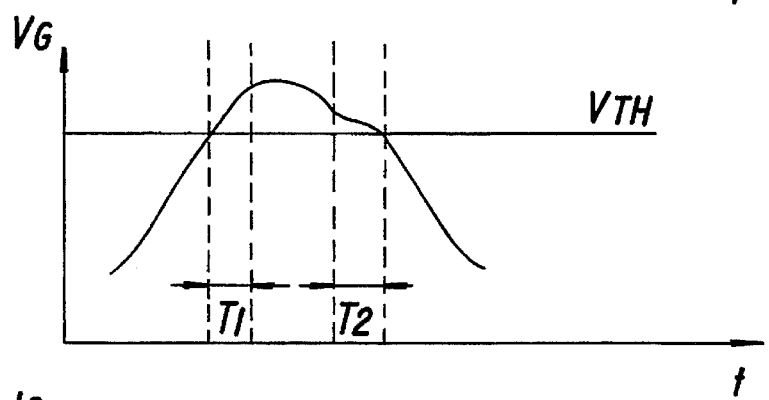
Figure 2C:
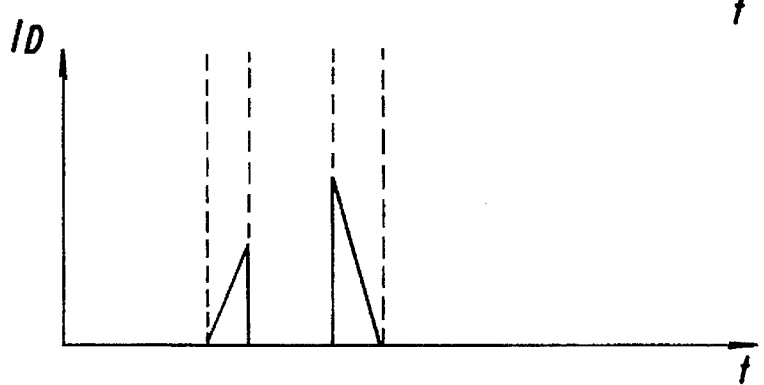
Figure 3:
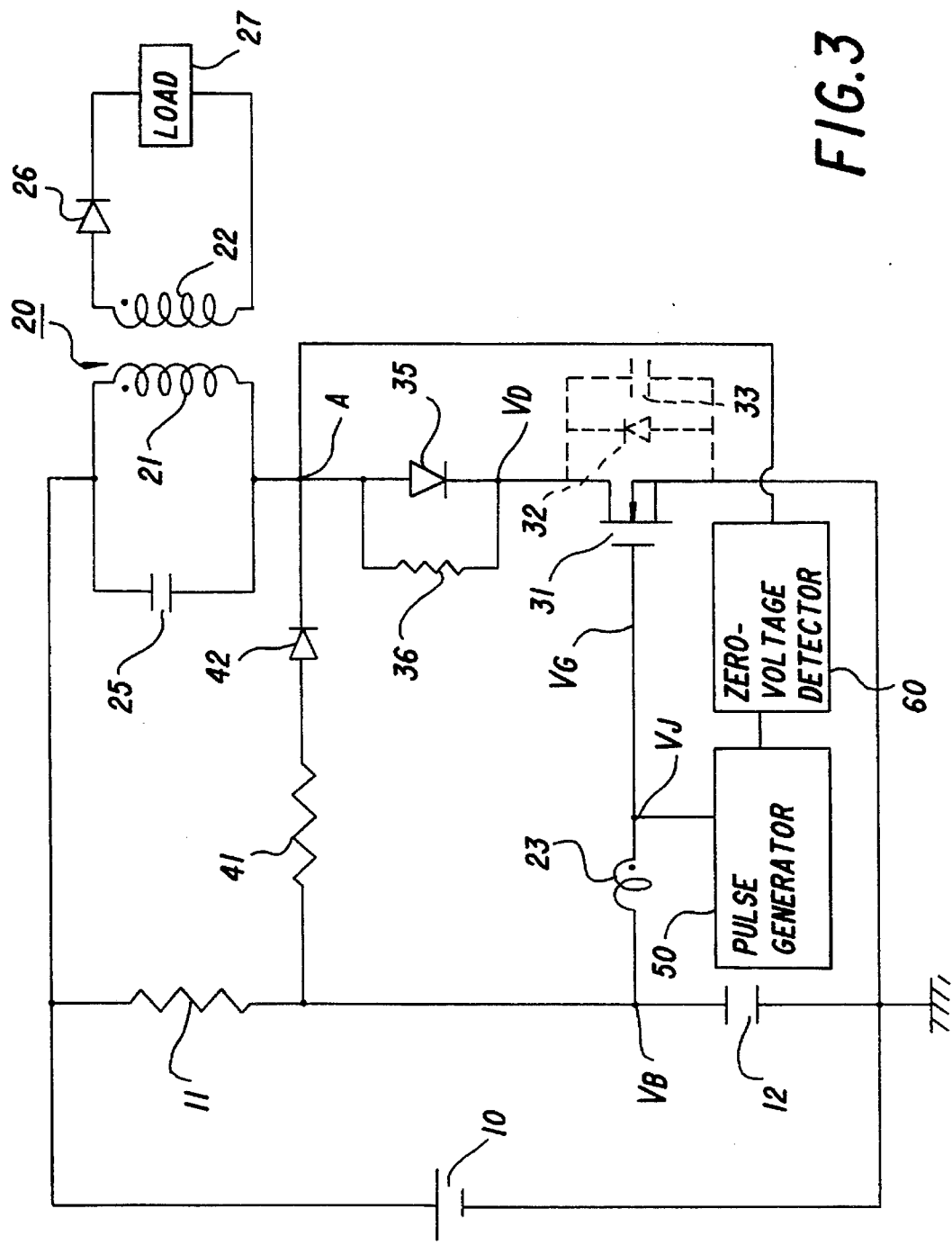
FIG. 3 is a circuit diagram of an inverter power supply in accordance with a first embodiment of the present invention.

First Embodiment <FIGS. 3 and 4>

Referring now to FIG. 3, there is shown an inverter power supply in accordance with a first embodiment of the present invention. The power supply comprises a DC voltage source 10 and a self-excited oscillator which includes a transformer 20 for converting the DC voltage from the DC source 10 into a high frequency AC voltage which is applied to drive a load 27. The transformer 20 has a primary winding 21, a secondary winding 22, and a feedback winding 23. The primary winding 21 is connected in parallel with a capacitor 25 to form a parallel L-C resonant circuit which is connected in series with an FET transistor 31 across the DC source 10 to constitute the oscillator. The secondary winding 22 is connected through a diode 26 to apply a corresponding DC voltage to load 27. Included in the power supply are a starter circuit of a resistor ill and a biasing capacitor 12 which are connected across the DC supply 10, and a bias stabilizing circuit composed of a resistor 41 and a bypass diode 42 connected in series between a drain terminal of FET 31 and a first end of the feedback winding 23. The feedback winding 23 has a second end connected to a gate terminal of FET 31, while the first end thereof is connected to a point between the starting resistor 11 and the biasing capacitor 12. At the start of energizing the power supply, the biasing capacitor 12 is firstly charged by the DC voltage source 10 to give a bias voltage so as to firstly turn on FET 31, as will be discussed later. After the power supply goes into a stable oscillation mode of providing a high frequency oscillation voltage across the primary winding 21, the biasing capacitor 12 acts to give an offset voltage VB which is added to a feedback voltage induced across the feedback winding 23 to provide a bias voltage VG applied to a gate terminal of FET 31 for alternately turning on and off FET 31 in a self-excited manner. A blocking diode 35 is inserted between the drain terminal of FET 31 and the diode 42 in an opposite relation to a parasitic diode 32 of FET 31 in order to block a current which would otherwise flow through the parasitic diode 32 and back into the DC voltage source 10 when the resonant circuit produces the resonant voltage greater than the input DC voltage in response to the ON-period of FET 31 becoming longer. Thus, an oscillation voltage developed by the resonant circuit, i.e., the drain voltage VD of FET 31 is permitted to go negative, as shown in FIG. 6, such that the biasing capacitor 12 is also permitted to discharge through the resistor 41 and the bypass diode 42 even when the drain voltage VG of FET goes negative relative to the ground. Connected in parallel with the blocking diode 32 is a bypass resistor 36 which allows a parasitic capacitor 33 inherent to FET 31 to discharge through the bypass resistor 36 during the OFF period of FET 31 to return a charge from the parasitic capacitor 33 to the resonant circuit.

Figure 7A:
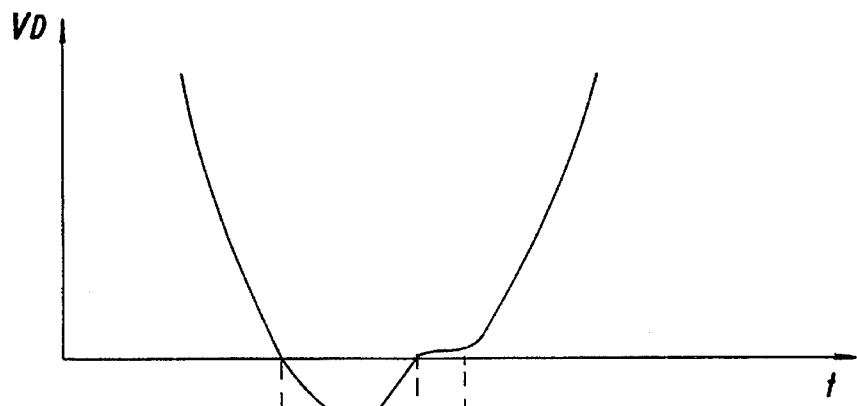
FIG. 7 is an enlarged waveform chart corresponding to FIG. 6.
Figure 7B:
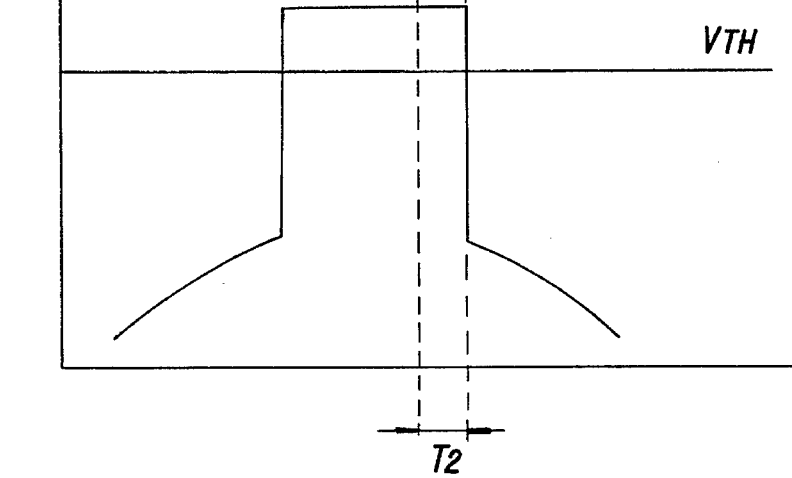
Figure 7C:
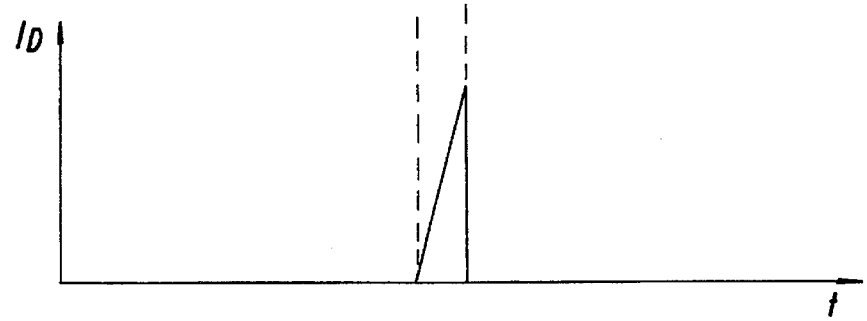

The power supply further includes a zero-voltage detector 60 which is connected to a point A between the primary winding 21 and the blocking diode 35 in order to detect the oscillation voltage from the L-C resonant circuit and issues a zero voltage signal when the oscillation voltage, i.e., the drain voltage of FET 31 lowers to zero level. As shown in FIG. 4, the detector 60 comprises a comparator 61 with its inverting input connected to the point A through a diode 63 and a resistor 62. A non-inverting input of comparator 61 is supplied with a reference level determined by a divider of resistors 65 and 66 connected to a DC supply. A resistor 64 is connected between an anode of diode 63 and ground so that a voltage VH fed to the inverting input of comparator 61 is lowered below the reference level only for a period $T_0$ in which the drain voltage VD is negative, as shown in FIGS. 5 and 6. Thus, the comparator 61 provides a high level output VI to a pulse generator 50 which comprises a monostable multivibrator with its output connected through a diode 53 to a connection between the feedback winding 23 and the gate terminal of FET 31. The pulse generator 50 is triggered by the high level output VI to produce a pulse VJ having a constant pulse-width T determined by a resistor 51 and a capacitor 52. The pulse voltage VJ is superimposed on the bias voltage (= offset voltage from capacitor 12+feedback voltage from feedback winding 23) such that the bias voltage VG exceeds a threshold voltage VTH of FET 31 only for the period T corresponding to the width of the pulse, thereby making FET 31 conductive for this period T, as shown in FIGS 6 and 7.

Operation of the inverter power supply will be now discussed. Upon energization of the power supply, the DC source 10 provides the DC voltage across the series circuit of the resistor 1 and the biasing capacitor 12 to begin charging the capacitor 12. When the capacitor 12 is charged to exceed the threshold voltage VTH of FET 31, FET 31 is firstly turned on to flow a current for supplying energy to the resonant circuit of the primary winding 21 and the capacitor 25 from the DC source 10 with an attendant decrease in the drain voltage VD. Subsequently, when drain voltage VD becomes lower than the voltage of capacitor 12, the bias stabilizing circuit comes into operation to discharge the capacitor 12 through resistor 41 and diode 42 and through FET 31, thereby lowering the gate voltage VG below the threshold voltage VTH to turn off FET 31. At this time, the drain voltage VD will not go negative and therefore the pulse generator 50 is kept inactive. Then, the L-C resonant circuit responds to start providing the oscillation voltage while inducing the corresponding feedback voltage. It is noted in this connection that, in the previous step of firstly turning off FET 31, the lowering of the gate voltage VG by the bias stabilizing circuit takes a rather long period before the gate voltage VG goes below the threshold voltage VTH. With this result, the primary winding 21 is supplied with extra energy in the previous ON-period of FET 31 than required for the resonant operation so that the oscillation voltage or the drain voltage VD of FET 31 is allowed to go negative. Therefore, in response to the drain voltage lowering to negative, the pulse generator 50 comes into operation to superimpose the pulse voltage on the feedback voltage now increasing with the lowering of the drain voltage $V_D$. While the offset voltage $V_B$ of capacitor 12 is high enough that the bias voltage (=offset voltage+feedback voltage) alone exceeds the threshold voltage $V_{TH}$ for a longer period than the pulse-width, FET 31 is caused to be again conductive on for this period in which the capacitor 12 discharges through the bias stabilizing circuit to further lower the bias voltage (=offset voltage+feedback voltage). In this manner the above step is repeated until the circuit comes into stable oscillation operation mode in which FET 31 is turned on only for the period determined by the pulse-width, as shown in FIG. 6. That is, the stable oscillation mode is achieved when the voltage of capacitor 12 settles to a suitable level.

Then, the power supply comes into the stable oscillation mode for providing the oscillation voltage across the primary winding 21 so as to give a substantially constant output voltage to the load. In this oscillation mode, ON-period T of FET 31 is solely determined by the pulse-width of the pulse superimposed on the bias voltage, as shown in FIGS. 6 and 7. Since the pulse is issued from the pulse generator 50 only after the zero-voltage detector 60 detects that the drain voltage $V_D$ lowers to zero level, FET 31 is not made conductive until the drain voltage $V_D$ lowers to zero. Therefore, FET 31 is prevented from becoming conductive prior to the drain voltage $V_D$ lowering to zero, which eliminates a switching loss which would otherwise occur at the beginning of the ON-period in the absence of the pulse voltage superimposed on the bias voltage. The pulse-width determining the ON-period of FET 31 is selected in consideration of the resonant circuit such that the drain voltage $V_D$ turns from negative to zero within this ON-period. That is, as shown in FIG. 7, ON-period T of FET 31 consists of dead period $T_0$ in which the drain voltage $V_D$ is negative and therefore no current flows through FET 31 and an effective period $T_2$ in which FET 31 is enabled to flow a current $I_D$ to energize the resonant circuit for continued oscillation. It should be noted here that the ON-period T can be selected to an optimum period in consideration of the resonant circuit in order to further reduce the switching loss at the end of the ON-period. In other words, FET 31 can be controlled to flow the current $I_D$ only when the drain voltage $V_D$ is around zero, as shown in FIG. 7, by suitably selecting the ON-period T in consideration of the resonant characteristics.

Figure 8:
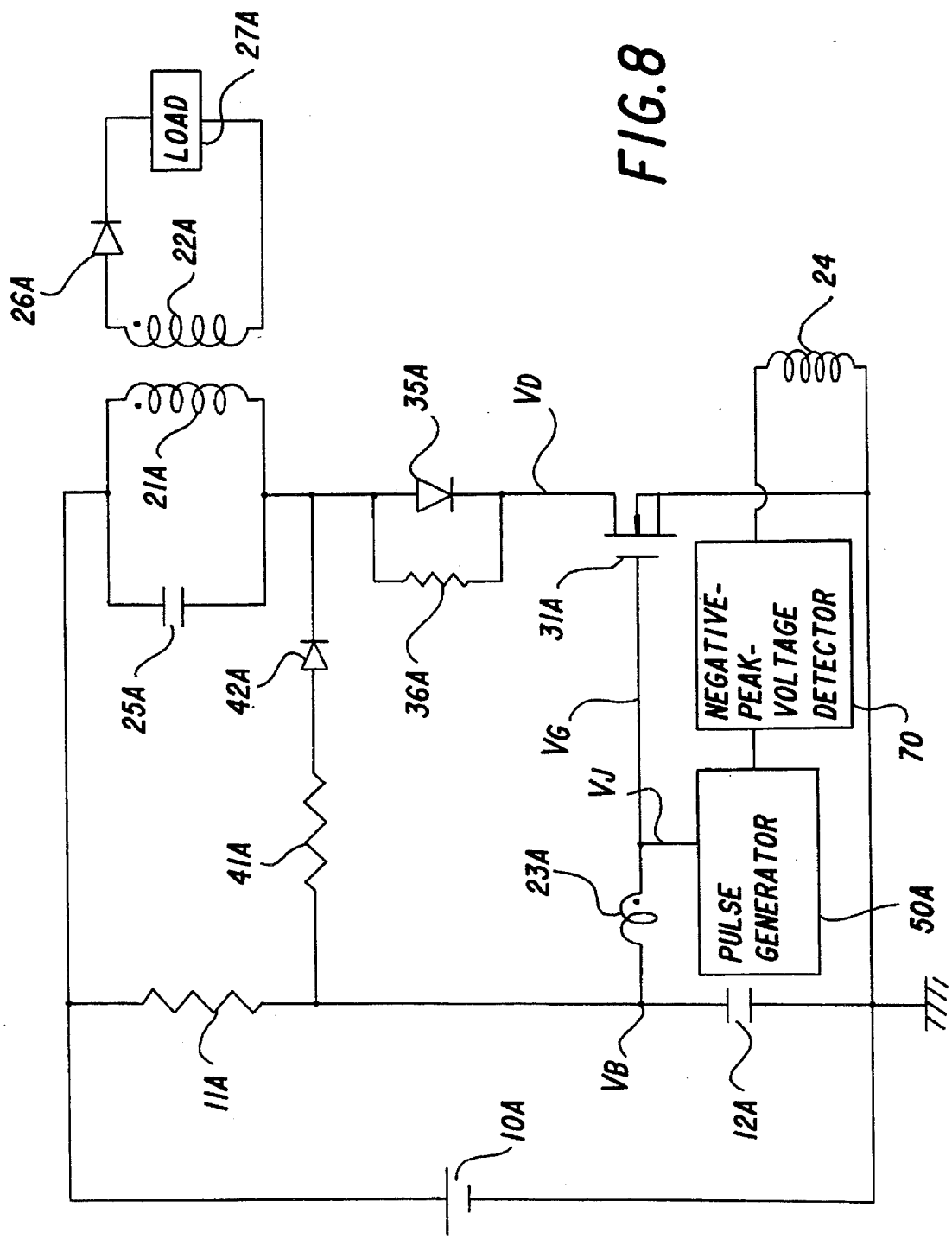
FIG. 8 is a circuit diagram of an inverter power supply in accordance with a second embodiment of the present invention.
Figure 9:
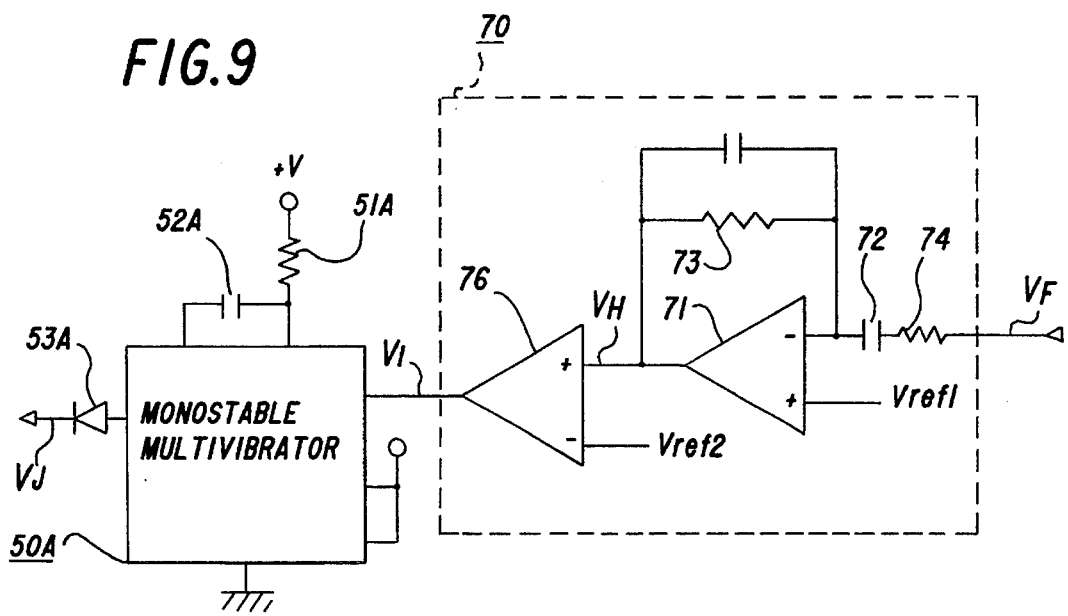
FIG. 9 is a circuit diagram of a pulse generator and a negative-peak voltage detector utilized in the circuit of FIG. 8.

Second Embodiment <FIGS. 8 and 9>

Figure 11A:
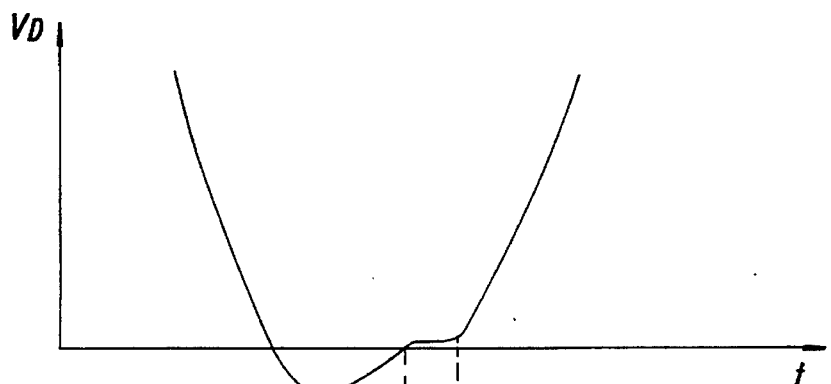
Figure 11B:
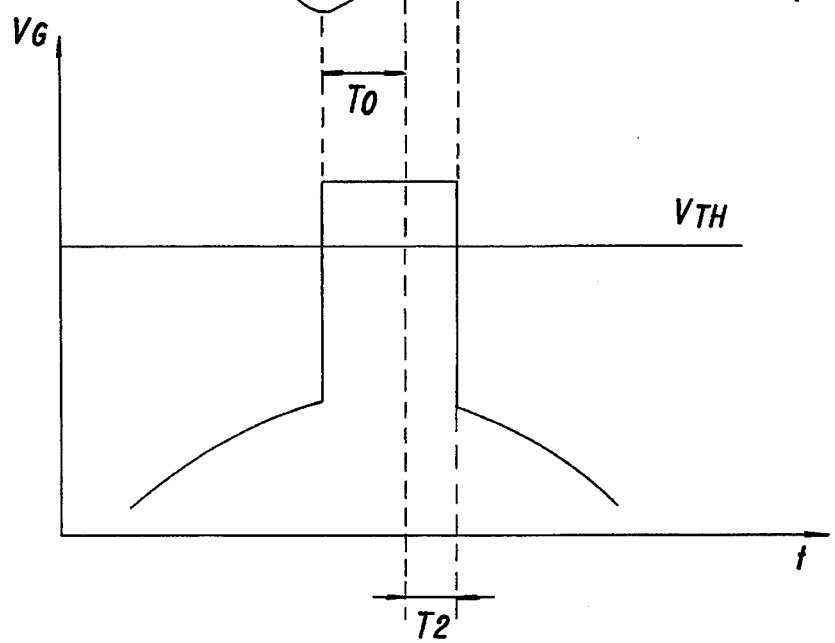
Figure 11C:
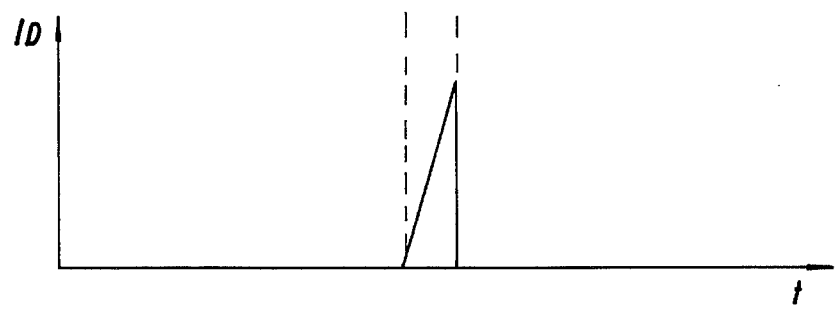

Referring to FIG. 8, there is shown a power supply in accordance with a second embodiment of the present invention which is similar to first embodiment except that a negative-peak-voltage detector 70 is utilized instead of the zero-voltage detector 60. Like elements are designated by like numerals with a suffix letter of "A". No duplicate explanation is made herein for the sake of simplicity. The negative-peak-voltage detector 70 detects a negative peak of the drain voltage $V_D$ and triggers a like pulse generator 50A upon detection of the negative peak so as to superimpose a resulting pulse voltage upon the bias voltage for the same purpose as in the first embodiment. An auxiliary winding 24 is magnetically coupled to the primary winding 21A to provide to the detector 70 an induced voltage indicative of the oscillation voltage or the drain voltage $V_D$. As shown in FIG. 9, the detector 70 comprises an operational amplifier 71 which is cooperative with a capacitor 72 and a resistor 73 to constitutes a differentiator providing an output $V_H$ proportional to a difference between the voltage $V_F$ received through a resistor 74 from the auxiliary winding 24 and a reference voltage $V_{ref1}$ at the non-inverting input. As shown in FIG. 10, the output $V_H$ is out of phase with the voltage $V_F$, or drain voltage $V_D$ by 90° and has a mid point coincident with the positive and negative peaks of the voltage $V_F$. The output $V_H$ from the amplifier 71 is fed to a non-inverting input of a comparator 76 which receives a reference voltage $V_{ref2}$ at its inverting input. The reference voltage $V_{ref2}$ is selected to be equal to a level at the mid point of the voltage $V_H$ so that the comparator 76 issues a high level output $V_I$ for a time period $t_1$ to $t_2$ which corresponds to a period in which the voltage $V_F$ increases from minimum to maximum, as shown in FIG. 10. The output $V_I$ from comparator 76 is fed to the pulse generator 50A which is triggered by the leading edge of the output $V_I$ to produce a pulse voltage $V_J$ with a pulse-width T determined by resistor 51A and capacitor 52A in the like manner as in the first embodiment. The pulse voltage $V_J$ is superimposed upon the bias voltage to give a resulting gate voltage $V_G$ to FET 31A, as shown in FIG. 11. Accordingly, FET 31A is made conductive only after the drain voltage $V_D$ lowers to its negative peak, and is kept conductive for the ON-period T which is solely determined by the pulse-width. The ON-period consists of the dead period $T_0$ in which the drain voltage $V_D$ is negative to flow no current and the effective period $T_2$ in which FET 31A allows to flow the current $I_D$ to energize the resonant circuit for continued oscillation. In this embodiment, the negative-peak-voltage detector 70 is connected to the auxiliary winding 24 to detect the negative peak of the drain voltage $V_D$ in terms of the induced voltage across the auxiliary winding 24, it is equally possible that the detector 70 is connected to a point between the primary winding 21A and FET 13A to directly detect the drain voltage $V_D$.

Figure 12:
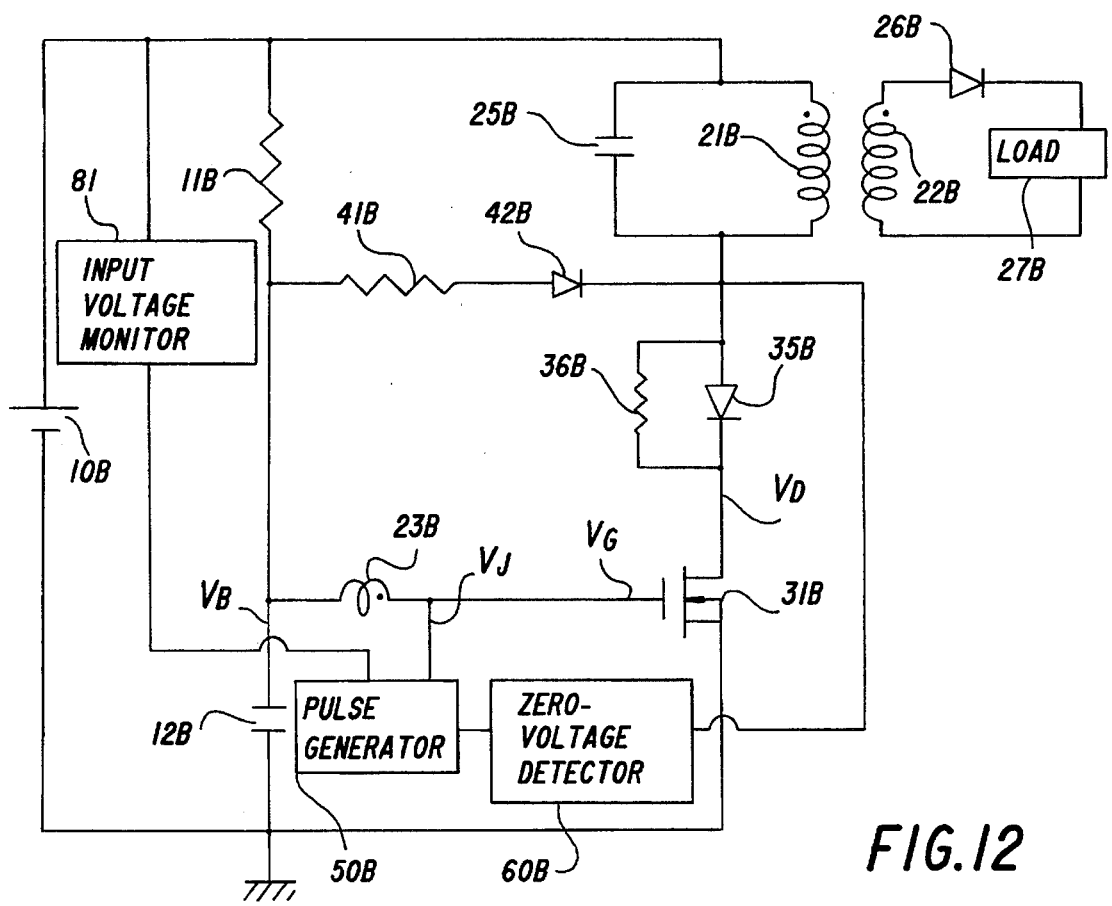
FIG. 12 is a circuit diagram of an inverter power supply in accordance with a third embodiment of the present invention.
Figure 10A:
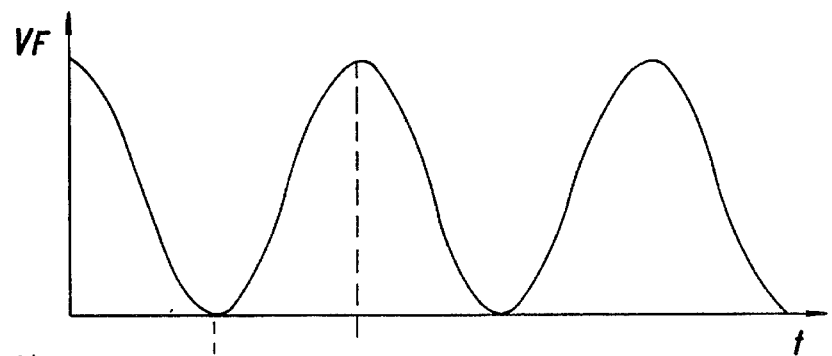
FIGS. 10 and 11 are waveform charts illustrating the operation of the power supply of FIG. 8.
Figure 10B:
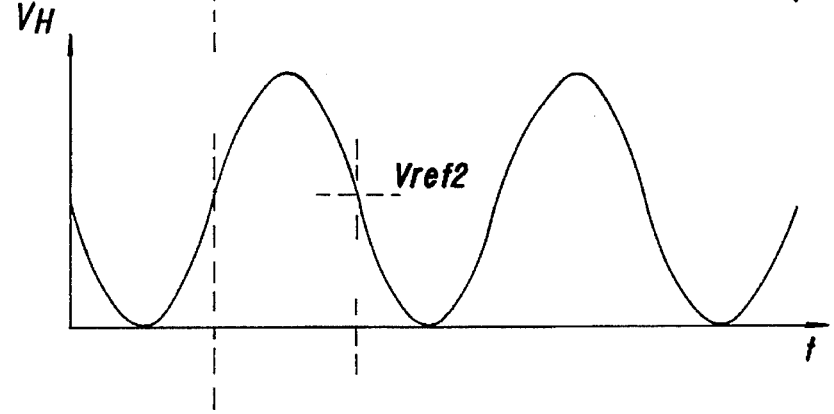
Figure 10C:
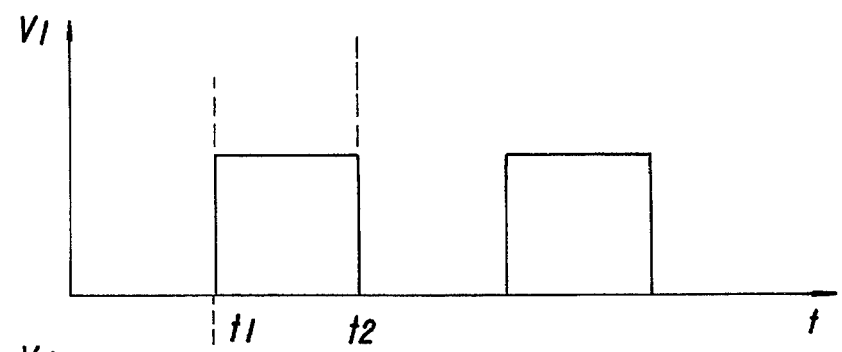
Figure 10D:
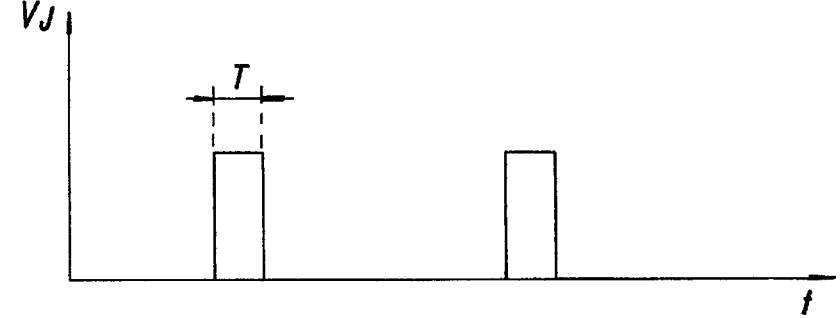
Figure 13:
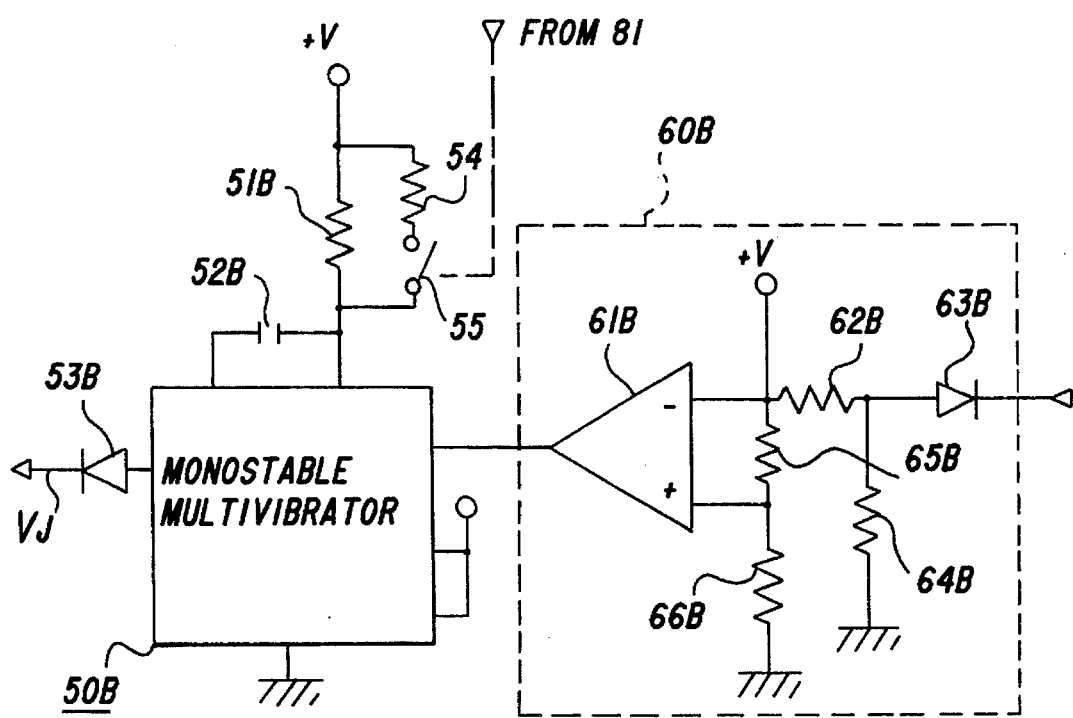
FIG. 13 is a circuit diagram of a pulse generator and a negative-peak voltage detector utilized in the circuit of FIG. 12.

Third Embodiment, <FIGS. 12 and 13>

FIGS. 12 and 13 shows a power supply in accordance with a third embodiment of the present invention which is similar to the first embodiment but additionally includes an input voltage monitor 81. Like elements are designated by like numerals with a suffix letter of "B". The input voltage monitor 81 is connected to the DC voltage source 10B to issue a limit signal when the DC voltage is monitored to exceed a predetermined level. The limit signal is fed to the pulse generator 50B for narrowing the width of the pulse voltage $V_J$ in order to limit the output of the resonant circuit. The pulse generator 50B includes an auxiliary resistor 54 connected in series with a switch 55 across the resistor 51B. The switch 55 is normally closed and is opened in response to the limit signal from the input voltage monitor 81 so that the resistor 51B is alone cooperative with the capacitor 52B to reduce the pulse-width of the pulse produced from the pulse generator 50B. That is, when the input voltage is lower than the predetermined level, the switch 55 is kept closed so that the pulse generator 50B produces the pulse voltage of which the pulse-width is determined by the composite resistance of parallel connected resistors 51B and 54 and capacitance of capacitor 52B and which is superimposed upon the bias voltage to give a corresponding gate voltage $V_G$ to FET 31B, as shown in FIG. 14. On the other hand, when the input voltage is monitored to exceed the reference level, the switch 55 is opened to reduce the pulse-width of the pulse which is generated at the pulse generator 50B and superimposed on the bias voltage, as shown in FIG. 15, thereby correspondingly lower the output voltage. Therefore, the power supply of this embodiment can utilize the DC voltage source of different voltages but produce a constant output voltage by suitable selecting the resistance of the resistors 51B and 55. Further, it is also possible to compensate for possible fluctuation in the input DC voltage to assure stable output voltage.

Figure 16:
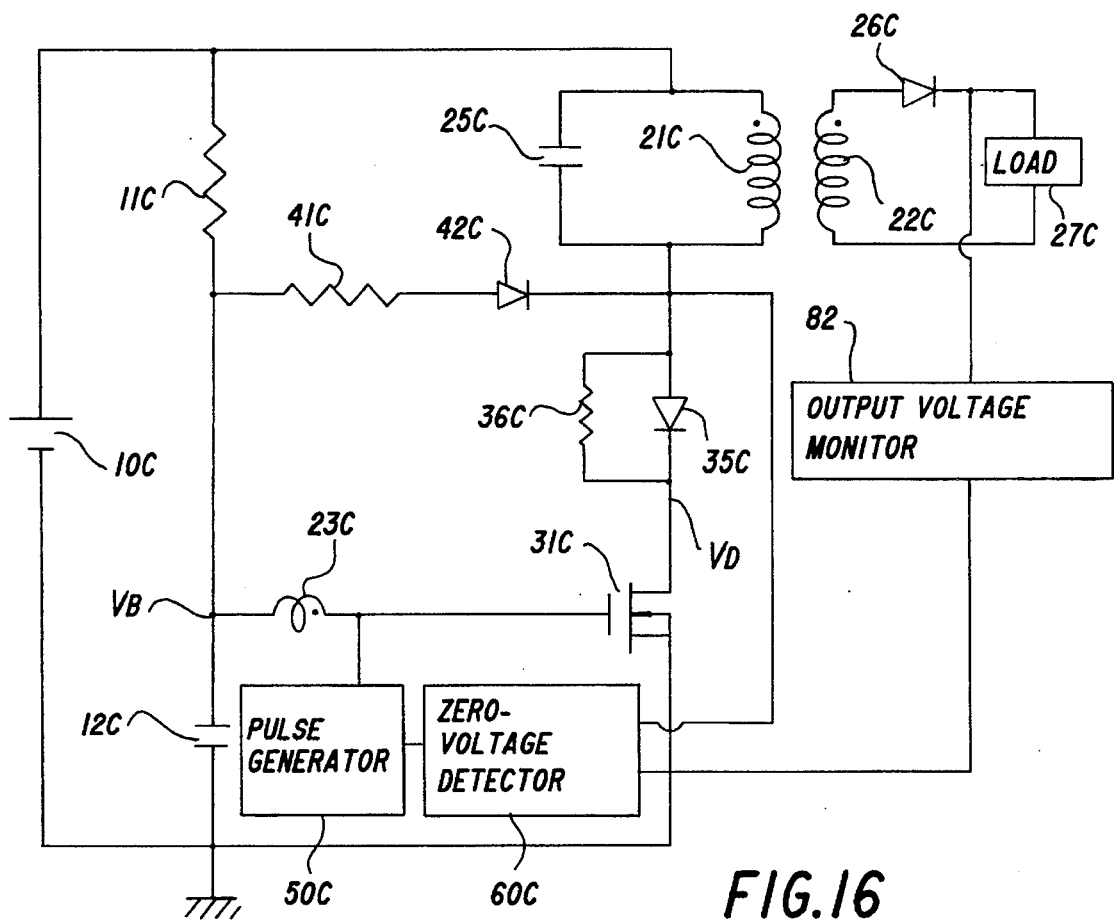
FIG. 16 is a circuit diagram of an inverter power supply in accordance with a fourth embodiment of the present invention.
Figure 17:
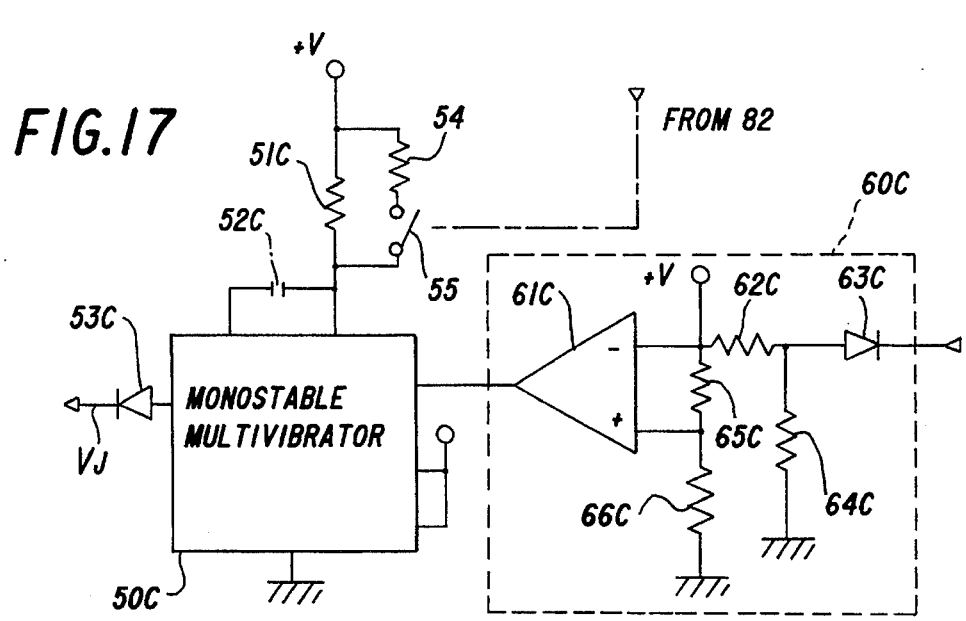
FIG. 17 is a circuit diagram of a pulse generator and a negative-peak voltage detector utilized in the circuit of FIG. 16.

Fourth Embodiment <FIGS. 16 and 17>

FIGS. 16 and 17 shows a power supply in accordance with a fourth embodiment of the present invention which is similar to the first embodiment but additionally includes an output voltage monitor 82. Like elements are designated by like numerals with a suffix letter of "C". The output voltage monitor 82 is connected to the cathode of diode 26C to issue a limit signal when the output DC voltage from the secondary winding 22C is monitored to exceed a predetermined level. The limit signal is fed to the pulse generator 50C for narrowing the width of the pulse voltage $V_J$ in order to limit the output of the resonant circuit. The pulse generator 50C includes an auxiliary resistor 54C connected in series with a switch 55C across the resistor 51C. The switch 55C is normally closed and is opened in response to the limit signal from the input voltage monitor 82 so that the resistor 51C is alone cooperative with the capacitor 52C to reduce the pulse-width of the pulse produced from the pulse generator 50C. When the output voltage is lower than the predetermined level, the switch 55C is kept closed so that the pulse generator 50C produces the pulse voltage having a standard pulse-width determined by the composite resistance of parallel connected resistors 51C and 54C and capacitance of capacitor 520, as explained in the third embodiment with reference to FIG. 14. On the other hand, when the output voltage is monitored to exceed the reference level, the switch 55C is opened to reduce the pulse-width of the pulse, in the like manner as discussed in the third embodiment with reference to FIG. 15, thereby correspondingly lowering the output voltage. Consequently, the power supply of this embodiment can compensate for impedance variations in the load 27C so as to give a stable output voltage to the load.

It should be noted in this connection that the input voltage detector 81 as well as the output voltage detector 82 may be configured to monitor different levels within a suitable range of the input and output voltages and produce signals indicating the monitored levels, and that the pulse generator may have a capability of varying the pulse-width successively over a wide range in response to the varying input and output voltages in order to effect more precise control of limiting the output voltage of the power supply. For instance, a variable resistor may be included in the pulse generator to successively vary the pulse-width.

Figure 18:
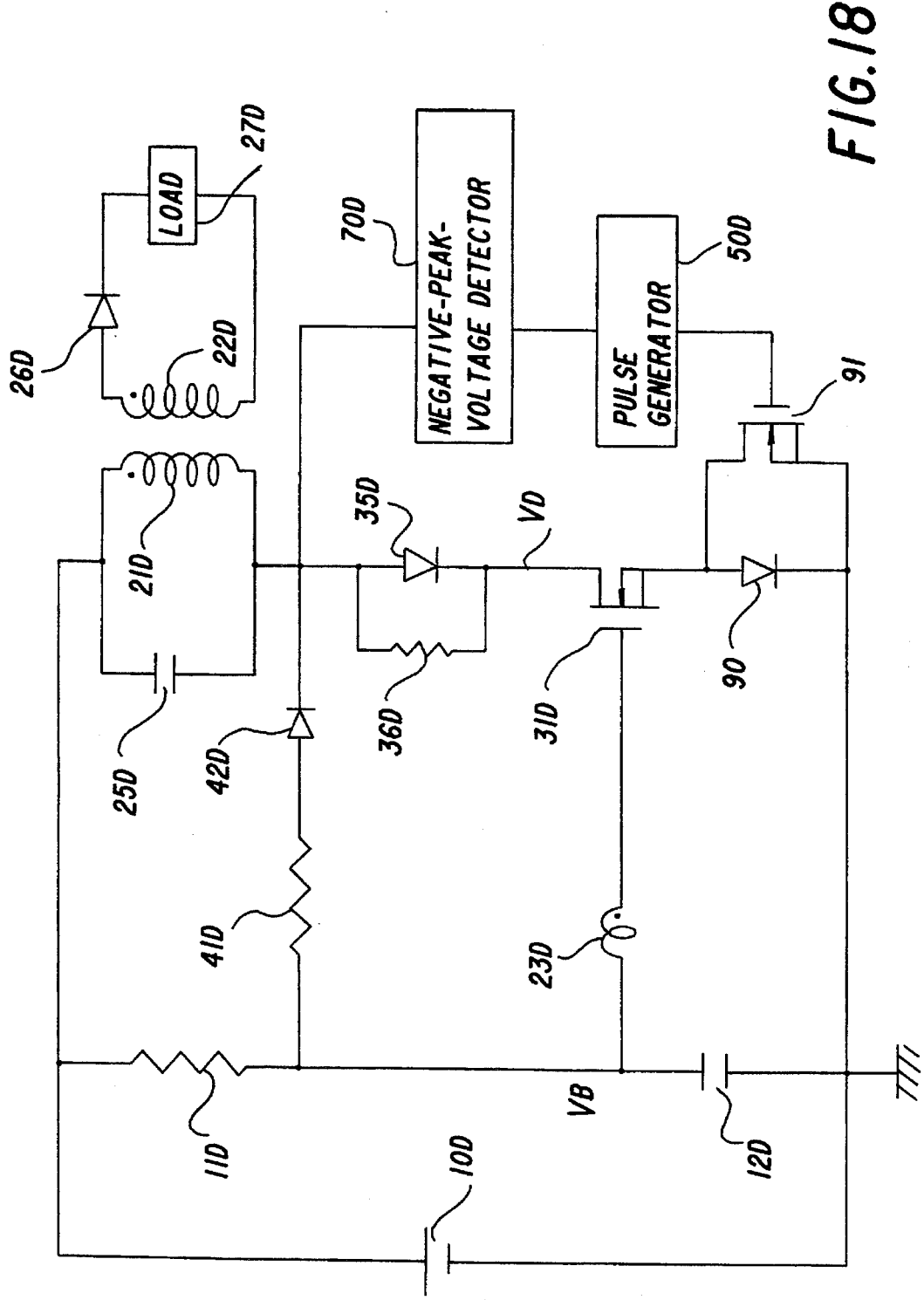
FIG. 18 is a circuit diagram of an inverter power supply in accordance with a fifth embodiment of the present invention.

Fifth Embodiment <FIG. 18>

Figure 19:
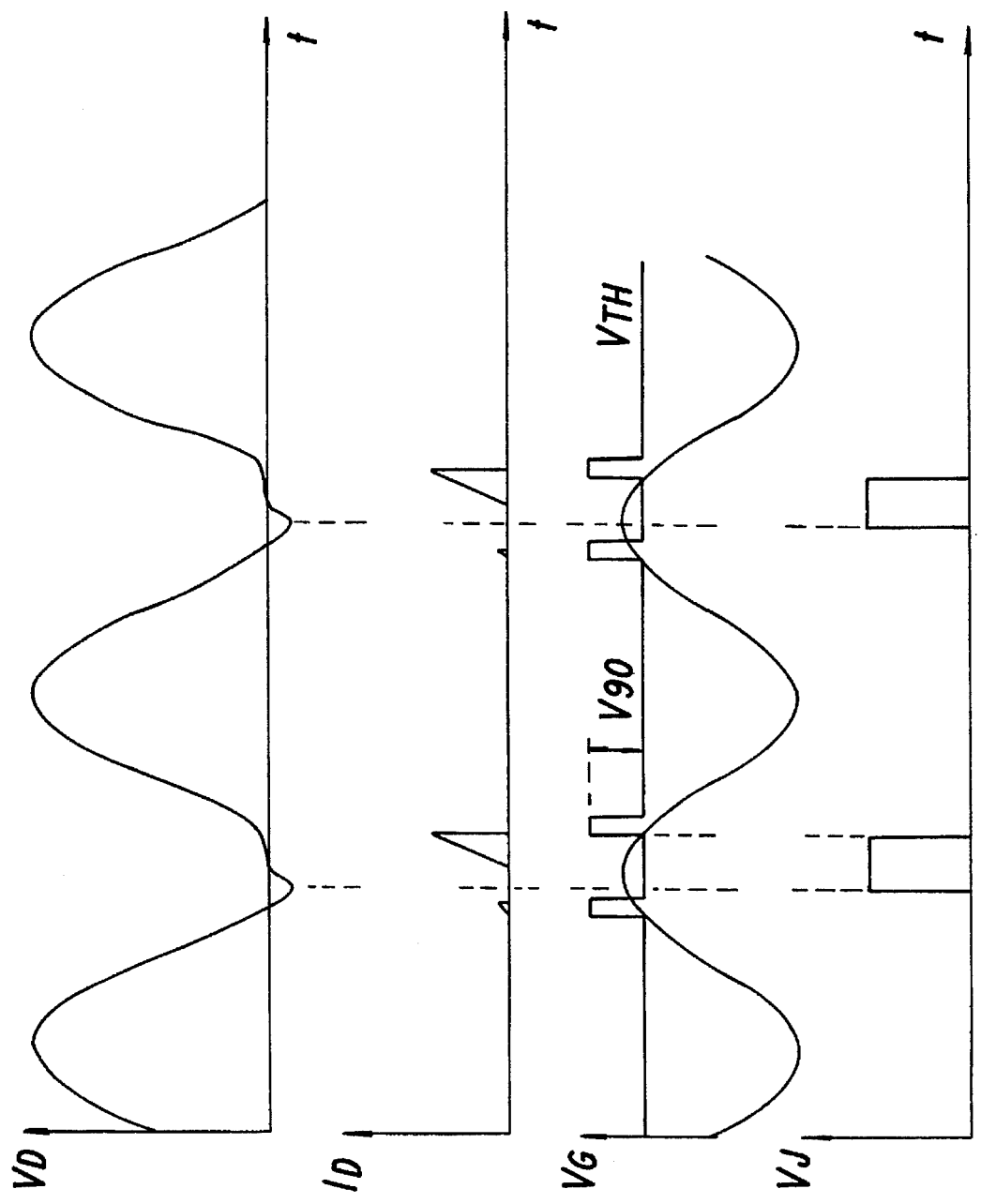
FIG. 19 is a waveform chart illustrating the operation of the power supply of FIG. 18.

FIG. 18 shows a power supply in accordance with a fifth embodiment of the present invention which is similar to the first embodiment but additionally includes a diode 90 inserted in series with FET 31D with an anode of diode 90 connected to the source terminal of FET 31D and another FET 91 connected in parallel with the diode 90. Like elements are designated by like numerals with a suffix letter of "D". When FET 31D is conductive to flow a current therethrough, the diode 90 thus connected between FET 31D and the ground develops thereacross a voltage $V_{90}$ which acts to raise a threshold voltage $V_{TH}$ of FET 31D with respect to the ground, as shown in FIG. 19. FET 91 receives at its gate a pulse produced from the pulse generator 50D upon the negative-peak voltage detector 70D detecting that the drain voltage $V_D$ lowers to its negative peak so that FET 91 is turned on by the pulse as soon as the drain voltage $V_D$ lowers to its negative peak and is kept conductive for the ON-period solely determined by the pulse-width, thereby shunting the diode 90 during the ON-period. Consequently, when FET 31D becomes conductive in response to the sinusoidal gate voltage $V_G$ exceeding the threshold voltage $V_{TH}$ with the increase of the feedback voltage, the threshold voltage $V_{TH}$ is raised to turn off FET 31D, after which the diode 90 is immediately bypassed by FET 91 in response to the drain voltage reaching its negative peak so as to lower the threshold voltage $V_{TH}$ back to the original. With this result, FET 31D is again turned on and is kept conductive for the ON-period T while the gate voltage $V_G$ exceeds the threshold level. The pulse-width of the pulse $V_J$ produced from the pulse generator 50D is selected to terminate at or before the sinusoidal gate voltage $V_G$ lowers to the threshold voltage $V_{TH}$ such that the FET 31D is made conductive only for the ON-period T determined by the pulse-width. Within the ON-period T, the current $I_D$ is allowed to flow through FET 31D after the drain voltage $V_D$ increases to zero from negative. Therefore, it is readily possible to reduce the switching loss of FET 31D by suitably selecting the pulse-width such that the current $I_D$ flows only after the drain voltage $V_D$ increases from negative to zero. In short, with regard to making FET 31D conductive, this embodiment is characterized to utilize a limited portion of a duration in which the sinusoidal gate voltage $V_G$ exceeds the threshold voltage $V_{TH}$, as opposed to the previous embodiments where the pulse voltage is superimposed to the gate voltage $V_G$. Although the diode 90 is utilized in the present embodiment to develop thereacross the potential for raising the threshold voltage $V_{TH}$ of FET 31D with respect to the ground, it is equally possible to utilize any other element such as a resistor which is capable of developing the potential for raising the threshold voltage $V_{TH}$ relative to the ground.

Figure 20:
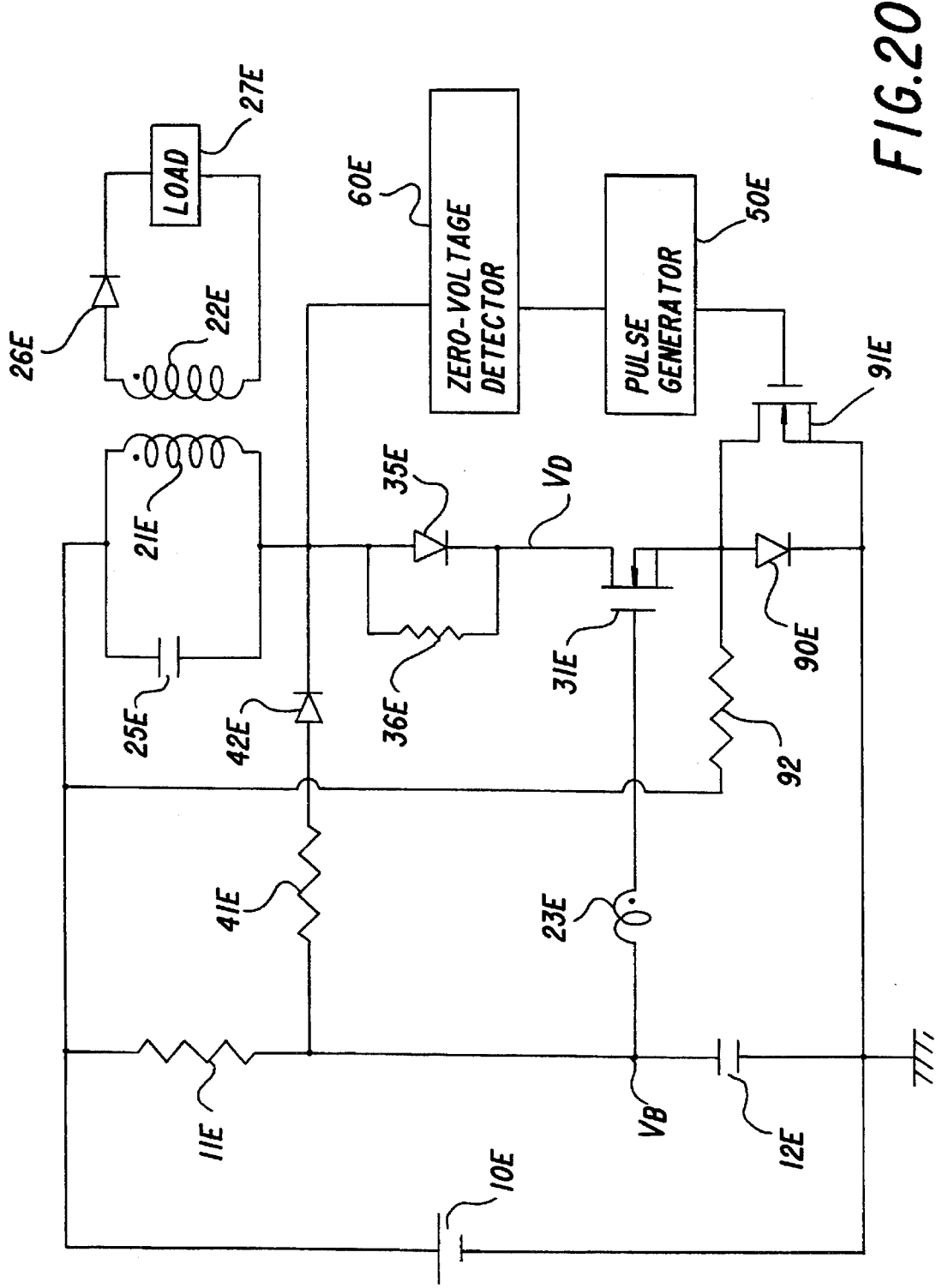
FIG. 20 is a circuit diagram of an inverter power supply in accordance with a sixth embodiment of the present invention.
Figure 21:
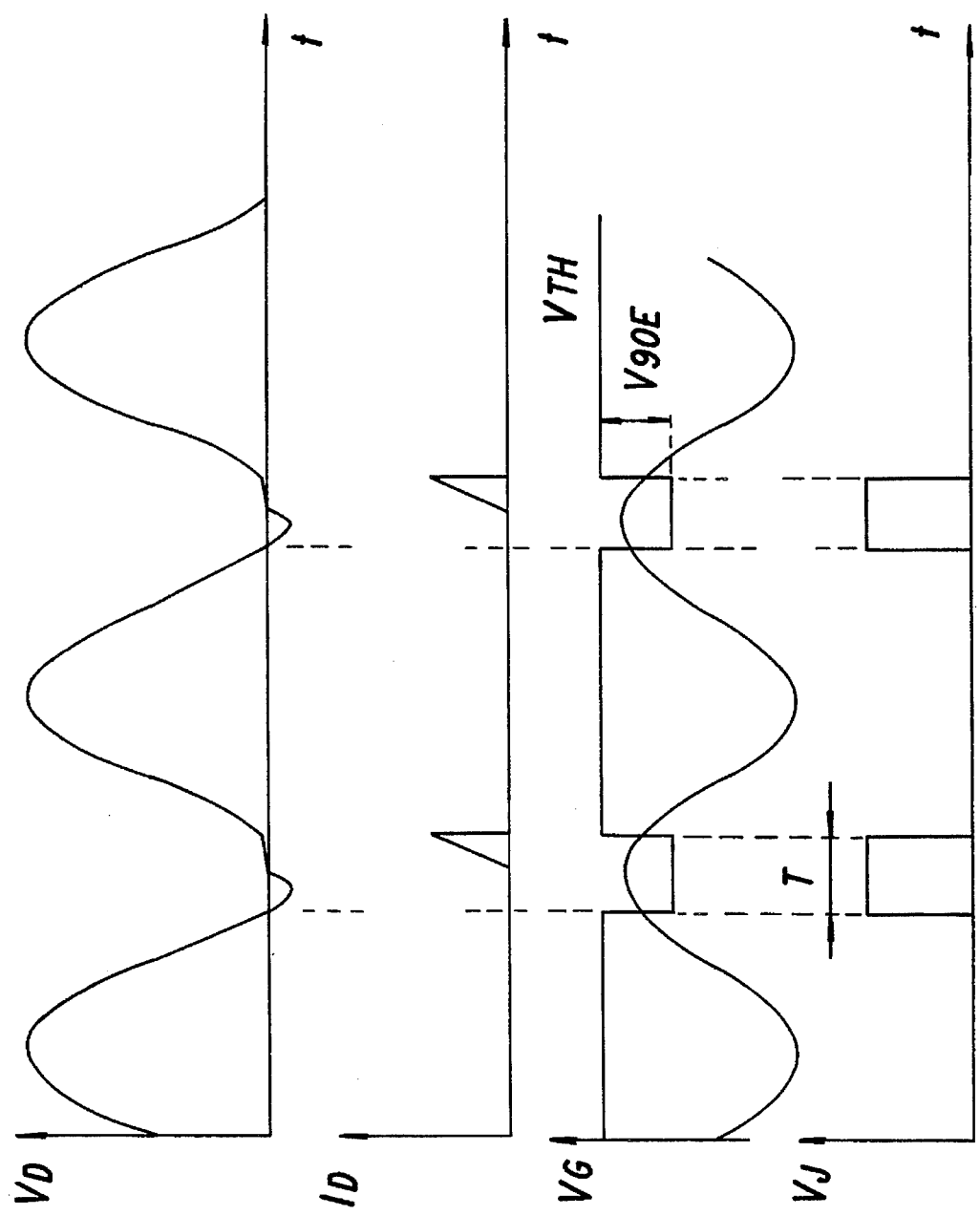
FIG. 21 is a waveform chart illustrating the operation of the power supply of FIG. 20.

Sixth Embodiment <FIG. 20>

FIG. 20 shows a power supply in accordance with a sixth embodiment of the present invention which is similar to the fifth embodiment but additionally includes a resistor 92 connected in series with the diode 90E across the DC voltage source 10E. Like elements are designated by like numerals with a suffix letter of "E". No duplicate explanation is made herein for the sake of simplicity. The present embodiment is presented to eliminate a problem as seen in the fifth embodiment. That is, in the fifth embodiment, a minor current $I_D$ is likely to flow at the very moment when the gate voltage $V_G$ first exceeds the threshold voltage $V_{TH}$ and before the diode 90 develops the potential to raise the threshold voltage $V_{TH}$ with respect to the ground, thereby somewhat weakening the effect of reducing the switching loss. This problem is solved in the present embodiment by the provision of the resistor 92 which provides a potential across the diode 90E constantly during the non-conductive condition of FET 91E. Therefore, the threshold voltage $V_{TH}$ with respect to the ground can be raised constantly over the gate voltage $V_G$ and be lowered below the gate voltage $V_G$ only when the pulse generator 50E produces the pulse $V_J$ in response to the drain voltage $V_D$ lowers to zero level and is kept below the gate voltage $V_G$ for the period determined by the pulse-width of the pulse $V_J$. Consequently, the ON-period T of FET 31E is determined substantially solely by the pulse-width of the pulse $V_J$. With this result, FET 31E is turned on only after the drain voltage $V_D$ lowers to zero so as not to flow the current $I_D$ until the drain voltage $V_D$ turns from the negative to zero, whereby successfully avoiding the above problem of flowing the current prior to the drain voltage $V_D$ lowers to zero level. Although the present embodiment utilizes the zero-voltage detector 60E so as to determine the start of the ON-period T, the negative-peak-voltage detector of the fifth embodiment may be alternately utilized so that the ON-period begins at the moment when the drain voltage $V_D$ lowers to its negative peak.

Figure 22:
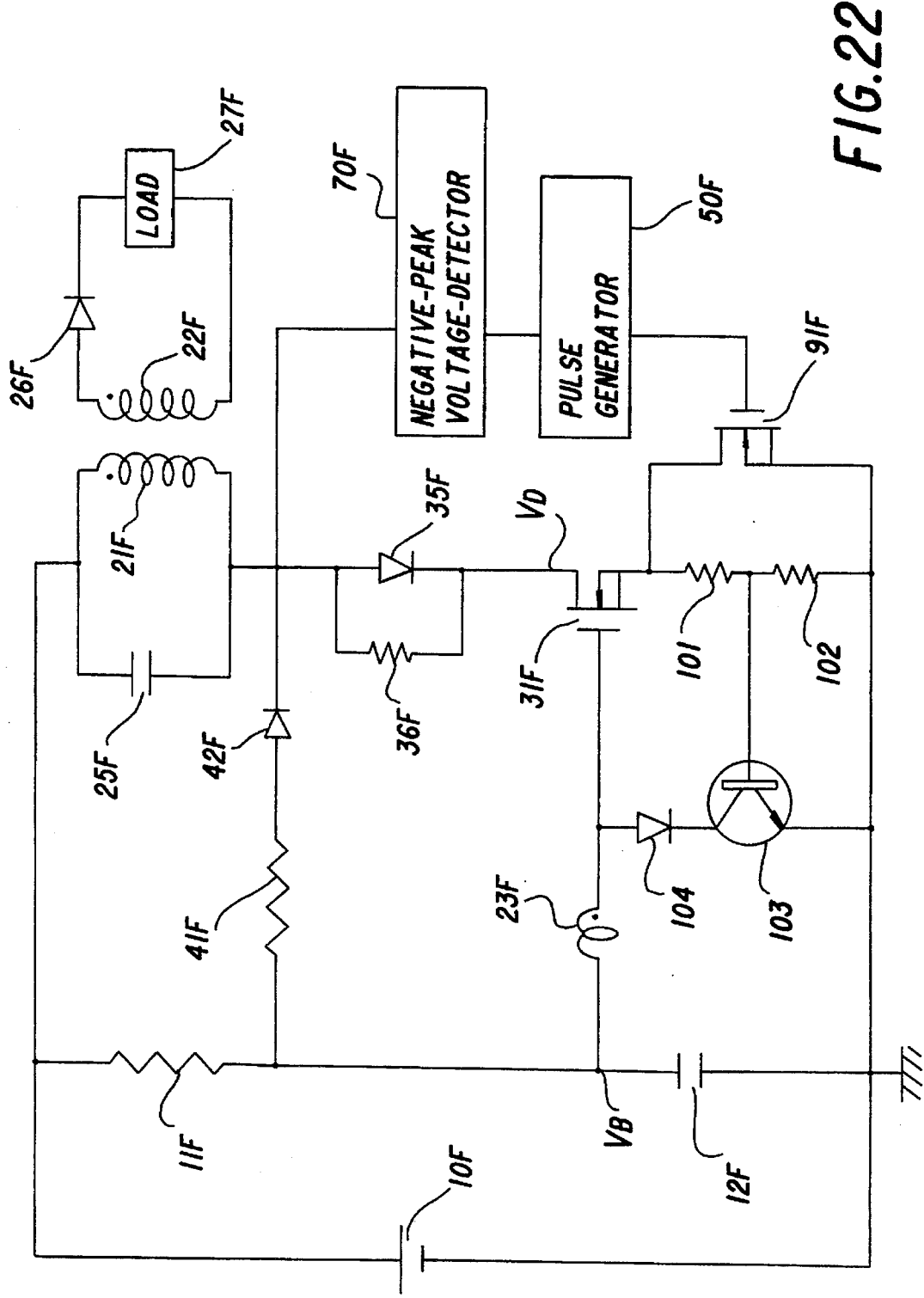
FIG. 22 is a circuit diagram of an inverter power supply in accordance with a seventh embodiment of the present invention.

Seventh Embodiment <FIG. 22>

Referring to FIG. 22, there is shown a power supply which is similar to the fifth embodiment except that a bipolar transistor 103 is connected to shunt the gate-source path of FET 31F and that a series combination of resistors 101 and 102 is inserted between the source of FET 31F and the ground instead of the diode 90 for developing thereacross the potential which raises the threshold voltage $V_{TH}$ of FET 31F with respect to the ground. Like elements are designated by like numerals with a suffix letter of "F". The present embodiment is particularly designed to avoid FET 31F from flowing a rush current at the start of the circuit for an extended interval, in addition to the effect of reducing the switching loss during the stable oscillation mode. Transistor 103 has its collector connected through a diode 104 to a point between the feedback winding 23F and the gate of FET 31F, while the second resistor 102 is connected across the base-emitter path of transistor 103. When, at the start of the power supply, the capacitor 12F is charged to exceed the threshold voltage $V_{TH}$, FET 31F becomes conductive to flow the current with a corresponding voltage across the resistor 102. As soon as the voltage across the resistor 102 increases to give a bias to transistor 103, transistor 103 is turned off to shunt the gate-drain path of FET 31F to rapidly lower the gate voltage, thereby turning off FET 31F. In this manner, FET 31F can be prevented from flowing the rush current for an extended interval which would otherwise occur at the start of energizing the circuit. That is, at the start of the power supply, the current initially flows through the primary winding 21F to induce the feedback voltage at the feedback winding 23F which is added to the voltage of capacitor 12F in the direction of increasing the gate voltage to keep the gate voltage above the threshold level in spite of the gradual decrease in the voltage of capacitor 12 by the bias stabilizing circuit of resistor 41F and diode 42F. Without the transistor 103, therefore, FET 31F would be kept conductive for an extended interval with the increasing gate voltage to flow undesired high current. Since the initial current can be maintained at a reduced level at the start of the power supply with the effect of transistor 103, it is possible to limit the energy supplied by the initial current and therefore reduce a flyback voltage appearing after FET 31F is turned off. The resistors 101 and 102 are selected to have suitable resistance such that transistor 103 is actuated only once at the start of the circuit. Thereafter, the bias stabilizing circuit of resistors 41F and diode 42F comes into operation to achieve the stable oscillation mode, as discussed in the first embodiment.

Although FET is utilized in the above embodiments as a switching element to periodically supply the energy to the resonant circuit, it is equally possible to utilize other switching element with a control terminal, for example, a bipolar transistor and IGBT (Isolation Gate Bipolar Transistor). When IGBT is utilized instead of FET, diode 35 and resistor 36 may be eliminated. When bipolar transistor is utilized, a resistor is added between the base of transistor and the feedback winding 23.

It is noted that the some features of the above embodiments could be suitably combined to achieve a more sophisticated operation or an effective circuit design.

What is claimed is:

1. An inverter power supply comprising:

a switching transistor having a gate, a source, and a drain;

a transformer having a primary winding and a feedback winding, said primary winding being connected in series with said switching transistor and a capacitor connected in parallel with said primary winding to form a resonant circuit, and said feedback winding being connected in series with said gate of said switching transistor;

a starter circuit for starting said resonant circuit;

a bias voltage generating circuit connected to apply a bias through said feedback winding to said gate which is a control terminal of said switching transistor;

a level detector connected at one end to said transformer, which issues a zero voltage signal when a voltage at said transformer is detected to have dropped to a level of zero or lower; and a pulse generator connected to receive said zero voltage signal from said level detector for producing as an output a pulse of predetermined pulse-width in response to said zero voltage signal, said output of said pulse generator being connected to said gate of said switching transistor to cause said switching transistor to turn on for an ON-period determined by said pulse-width.

2. An inverter power supply comprising:

a DC voltage source;

a transformer having a primary winding, a secondary winding, and a feedback winding;

a parallel L-C resonant circuit composed of said primary winding and a capacitor;

a switching transistor having a control terminal and connected in series with said primary winding across said DC voltage source to be energized thereby for causing said L-C resonant circuit to produce an oscillation voltage across said primary winding, while producing a corresponding feedback voltage across said feedback winding, said oscillation voltage being allowed to go negative at a point between said switching transistor and said primary winding, said oscillation voltage being supplied through said secondary winding to apply a resulting output voltage to a load;

a starter circuit composed of a resistor and a biasing capacitor connected in series across said DC voltage source, said biasing capacitor connected in series with said feedback winding to apply an offset voltage which is additive to said feedback voltage developed across said feedback winding to give a bias voltage to said control terminal of said switching transistor for driving said switching transistor to turn on and off in a self-excited manner;

a bias stabilizing circuit having a series combination of a resistor and a diode which is connected in parallel with said feedback winding in order to discharge said biasing capacitor through said resistor, said diode, and said switching transistor when said switching transistor is conductive for adjusting said bias voltage in a direction of stabilizing said bias voltage to effect a stable oscillation at said resonant circuit;

a level detector connected at one end to said transformer, which issues a zero voltage signal when a voltage at said transformer is detected to have dropped to a level of zero or lower; and a pulse generator connected to receive said zero voltage signal from said level detector, for producing as an output a pulse of predetermined pulse-width in response to said zero voltage signal, said output of said pulse generator being connected to said gate of said switching transistor to cause said switching transistor to turn on for an ON-period determined by said pulse-width.

3. An inverter power supply as set forth in claim 1 or 2, wherein a pulse voltage of said pulse from said pulse generator is superimposed on said bias voltage so as to turn on said switching transistor only for an ON-period determined by the pulse-width.

4. An inverter power supply as set forth in claim 1 or 2, further including:

a potential developing element which is inserted between said switching transistor and ground so as to develop a corresponding potential across said element when said switching transistor is conductive to flow a current through said element, said potential acting to raise a threshold voltage of said switching transistor with respect to the ground;

a bypass switch connected in parallel with said potential developing element to lower said threshold voltage of said switching transistor when closed to shunt said potential developing element;

said pulse, which is produced from said pulse generator in response to said oscillation voltage lowering to at least to zero level, actuating to close said bypass switch, thereby lowering said threshold voltage and enabling said switching transistor to be made conductive for a time period determined by the pulse width.

5. An inverter power supply as set forth in claim 1 or 2, wherein said level detector issues said zero voltage signal when said oscillation voltage is detected to lower to a zero level.

6. An inverter power supply as set forth in claim 1 or 2, wherein said level detector issues said zero voltage signal when said oscillation voltage is detected to reach a negative peak.

7. An inverter power supply as set forth in claim 1 or 2, further including:

an input voltage monitor which issues a limit signal when an input DC voltage from said DC voltage source is monitored to become greater than a predetermined voltage level, said pulse generator having a pulse-width controller which reduces the pulse-width in response to said limit signal.

8. An inverter power supply as set forth in claim 1 or 2, further including:

an output voltage monitor which issues a limit signal when an output DC voltage from said secondary winding is monitored to become greater than a predetermined voltage level, said pulse generator having a pulse-width controller which reduces the pulse-width in response to said limit signal.

9. An inverter power supply as set forth in claim 4, wherein a resistor is connected in series with said potential developing element across said DC voltage source so as to develop said potential thereacross constantly during said switching transistor being kept turned off.

10. An inverter power supply as set forth in claim 4, wherein said potential developing element is a diode.

11. An inverter power supply as set forth in claim 4, wherein said potential developing element is a resistor.

12. An inverter power supply as set forth in claim 4, wherein said potential developing element is a series connected pair of first and second resistors, and further includes a switching element which is connected to turn off said switching transistor when said switching transistor becomes conductive at the start of energizing said power supply to flow through said second resistor an initial current exceeding a predetermined level.

13. An inverter power supply as set forth in claim 12, wherein said switching element is a bipolar transistor which is connected in parallel with the series combination of said biasing capacitor and said feedback winding, while a collector of said bipolar transistor is connected to a point between said feedback winding and said control terminal of said switching transistor, said second resistor connected across a base-emitter path of said bipolar transistor such that, when said switching transistor becomes conductive at the start of energizing said power supply to flow the initial current exceeding a predetermined level to give a corresponding voltage across said second resistor, said bipolar transistor responds to turn on to thereby turn off said switching transistor.

14. An inverter power supply comprising:

a switching transistor having a gate, a source, and a drain;

a transformer having a primary winding and a feedback winding, said primary winding being connected in series with said switching transistor, and a capacitor connected in parallel with said primary winding to form a resonant circuit, and said feedback winding being connected in series with said gate of said switching transistor;

a pulse-controlled transistor connected in series with said source of said switching transistor;

a starter circuit for starting said resonant circuit;

a bias voltage generating circuit connected to apply a bias through said feedback winding to said gate which is a control terminal of said switching transistor;

a level detector connected at one end to said transformer, which issues a zero voltage signal when a voltage at said transformer is detected to have dropped to a level of zero or lower; and a pulse generator connected to receive said zero voltage signal from said level detector, for producing as an output a pulse of predetermined pulse-width in response to said zero voltage signal, said output of said pulse generator being connected to a gate of said pulse-controlled transistor to cause said pulse-controlled transistor to turn on for an ON-period determined by said pulse-width, which in turn causes current to flow across said switching transistor for a period determined by said ON-period of said pulse-controlled transistor.

15. An inverter power supply comprising:

a DC voltage source supply a DC voltage;

a switching element;

a transformer having a primary winding which is connected in parallel with a capacitor to form a resonant circuit, said primary winding being connected in series with said switching element across said DC voltage source so that said resonant circuit produces an oscillation voltage about said DC voltage from said DC voltage source in response to the turning on and off of said switching element;

a level detector which detects an oscillation voltage developed across said resonant circuit and issues a zero voltage signal when said oscillation voltage is detected to be zero or lower; and means connected to receive said zero voltage signal and connected to control said switching element to turn on, in response to said zero voltage signal, only for a period in which said oscillation voltage is zero or lower.

\* \* \* \* \*